US011321954B1

(12) United States Patent
Lee et al.

(10) Patent No.: US 11,321,954 B1
(45) Date of Patent: May 3, 2022

(54) COMPUTER-VISION TECHNIQUES FOR TIME-SERIES RECOGNITION AND ANALYSIS

(71) Applicant: SAS Institute Inc., Cary, NC (US)

(72) Inventors: Taiyeong Lee, Cary, NC (US); Michael James Leonard, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/518,274

(22) Filed: Nov. 3, 2021

Related U.S. Application Data

(60) Provisional application No. 63/229,053, filed on Aug. 3, 2021.

(51) Int. Cl.
*G06K 9/00* (2022.01)
*G06V 30/41* (2022.01)
*G06T 7/90* (2017.01)
*G06T 3/40* (2006.01)
*G06T 11/20* (2006.01)
*G06T 7/13* (2017.01)
(Continued)

(52) U.S. Cl.
CPC ............ *G06V 30/41* (2022.01); *G06T 3/4007* (2013.01); *G06T 7/13* (2017.01); *G06T 7/162* (2017.01); *G06T 7/90* (2017.01); *G06T 11/203* (2013.01); *G06T 11/206* (2013.01); *G06V 10/26* (2022.01); *G06V 10/48* (2022.01); *G06V 10/72* (2022.01);
(Continued)

(58) Field of Classification Search
CPC ......... G06T 3/4007; G06T 7/13; G06T 7/162; G06T 7/90; G06T 2207/10024; G06T 2207/20021; G06T 2207/20061; G06T 2207/20072; G06T 2210/32; G06V 30/41;
(Continued)

(56) References Cited

U.S. PATENT DOCUMENTS 9,547,908 B1 * 1/2017 Kim ............... G06V 40/162
10,909,313 B2 2/2021 Can et al.
(Continued)

OTHER PUBLICATIONS

"GRABIT—File Exchange—MATLAB Central", MathWorks, Available Online at: https://www.mathworks.com/matlabcentral/fileexchange/7173-grabit, Accessed from Internet on Sep. 16, 2021, 3 pages.
(Continued)

*Primary Examiner* — Duy M Dang
(74) *Attorney, Agent, or Firm* — Kilpatrick Townsend & Stockton LLP

(57) ABSTRACT

Some examples herein describe time-series recognition and analysis techniques with computer vision. In one example, a system can access an image depicting data lines representing time series datasets. The system can execute a clustering process to assign pixels in the image to pixel clusters. The system can generate image masks based on attributes of the pixel clusters, and identify a respective set of line segments defining the respective data line associated with each image mask. The system can determine pixel sets associated with the time series datasets based on the respective set of line segments associated with each image mask, and provide one or more pixel sets as input for a computing operation that processes the pixel sets and returns a processing result. The system may then display the processing result on a display device or perform another task based on the processing result.

30 Claims, 28 Drawing Sheets
(13 of 28 Drawing Sheet(s) Filed in Color)

(51) Int. Cl.
*G06T 7/162* (2017.01)
*G06V 10/26* (2022.01)
*G06V 10/48* (2022.01)
*G06V 10/72* (2022.01)
*G06V 10/762* (2022.01)

(52) U.S. Cl.
CPC ............. *G06V 10/7635* (2022.01); *G06T 2207/10024* (2013.01); *G06T 2207/20021* (2013.01); *G06T 2207/20061* (2013.01); *G06T 2207/20072* (2013.01); *G06T 2210/32* (2013.01)

(58) Field of Classification Search
CPC ........ G06V 10/26; G06V 10/48; G06V 10/72; G06V 10/7635
See application file for complete search history.

(56) References Cited

U.S. PATENT DOCUMENTS

| | | | | |
|---|---|---|---|---|
| 2012/0310939 A1* | 12/2012 | Lee | ............. | G06F 16/907 |
| | | | | 707/E17.046 |
| 2013/0051663 A1* | 2/2013 | Krishnaswamy | .... | H04N 1/6047 |
| | | | | 382/164 |
| 2015/0269241 A1* | 9/2015 | Lee | ............. | G06F 16/285 |
| | | | | 707/737 |
| 2015/0278640 A1* | 10/2015 | Johnson | ............. | G06T 7/13 |
| | | | | 382/110 |
| 2017/0061625 A1* | 3/2017 | Estrada | ............. | G06T 7/90 |

OTHER PUBLICATIONS

Cohen et al., "Visual Forecasting of Time Series with Image-to-Image Regression", arXiv:2011.09052, Available Online at: https://arxiv.org/abs/2011.09052, Nov. 18, 2020, 10 pages.

Li et al., "Forecasting with Time Series Imaging", Expert Systems with Applications, vol. 160, Dec. 1, 2020, 13 pages.

Rohatgi , "Web Plot Digitizer User Manual", Automeris, Version 4.3, Jul. 6, 2020, 23 pages.

Siripurapu , "Convolutional Networks for Stock Trading", Stanford University Department of Computer Science, 2015, 6 pages.

Velay et al., "Stock Chart Pattern Recognition with Deep Learning", Artificial Intelligence Department of Lusis, Jun. 2018, 6 pages.

* cited by examiner

```
import sas_time_series_image_utility as ut
import sas_forecasting_module as fm image_name = "airline.png"
detect the number of time series by color detection
min_color_list, mean_color_list, median_color_list, max_color_list \
    = ut.detect_color_from_time_series_plot(image_name,0.1,100,False)
# extract data from time series plot
ydata_dict = ut.extract_data_from_time_series_plot(image_name = image_name,
                                                   min_color_list = min_color_list,
                                                   max_color_list = max_color_list,
                                                   min_line_length = 2,
                                                   plot=False)

# forecasting
fcst_dict = fm.LSTM_Forecasting_Airline_Setting(input_dict=ydata_dict)
# retrieve the forecasted image
ut.create_forecast_image(image_name=image_name,
                         fcst_dict=fcst_dict)
```

FIG. 20

COMPUTER-VISION TECHNIQUES FOR TIME-SERIES RECOGNITION AND ANALYSIS

REFERENCE TO RELATED APPLICATIONS

This application claims the benefit of priority under 35 U.S.C. § 119(e) to U.S. Provisional Patent Application No. 63/229,053, filed Aug. 3, 2021, the entirety of which is hereby incorporated by reference herein.

TECHNICAL FIELD

The present disclosure relates generally to computer vision. More specifically, but not by way of limitation, this disclosure relates to a system that can apply computer-vision techniques to recognize and derive time series information from the graph images, process the derived time series information, and return the processing results in any suitable format such as a computer vision format.

BACKGROUND

Time series information is used in numerous industries to detect anomalies, identify trends, detect deviations, and perform other types of analysis. In general, time series information includes a sequence of data points spanning a period of time, for example sensor measurements obtained from a voltmeter or fluid-flow sensor over the course of a particular timeframe. Time series information can be supplied as input to analytical tools executable by a computer to derive insights from the time series information, where the insights may be useful in performing tasks or detecting events.

Time series information is typically stored as a dataset of data points, where each data point includes a magnitude value of the data point and a corresponding timestamp. When the time series information is stored as a dataset, it is easily ingested by a computer for use in subsequent analytical operations. But in some circumstances, time series information may be depicted in an image. For example, stock market data may be depicted in an image. The image may be a digital image (e.g., a JPEG or PNG image) or a physical image printed or otherwise generated on a surface (e.g., paper). In these circumstances, it may be more challenging for a computer to recognize, parse, and analyze the time series information and return (e.g., automatically) meaningful results of the analysis.

SUMMARY

One example of the present disclosure includes a system comprising: one or more processors; and one or more memories including program code that is executable by the one or more processors for causing the one or more processors to perform operations. The operations can include accessing an image depicting a time series graph having a plurality of data lines representing a plurality of time series datasets. The operations can include executing a clustering process to assign each pixel in the image to one of a plurality of pixel clusters based on one or more color values of the pixel, each pixel cluster of the plurality of pixel clusters corresponding to a respective data line of the plurality of data lines. The operations can include generating a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters. The operations can include identifying a respective set of line segments defining the respective data line associated with each image mask of the plurality of image masks by performing object detection on the image mask or an edge image derived from the image mask. The operations can include determining a plurality of pixel sets associated with the plurality of time series datasets based on the respective set of line segments associated with each image mask. The operations can include providing at least one pixel set of the plurality of pixel sets as input for a computing operation that is configured to process the at least one pixel set and return a processing result. The operations can include outputting the processing result for display on a display device.

Another example of the present disclosure includes a non-transitory computer-readable medium comprising program code that is executable by one or more processors for causing the one or more processors to perform operations. The operations can include accessing an image depicting a time series graph having a plurality of data lines representing a plurality of time series datasets. The operations can include executing a clustering process to assign each pixel in the image to one of a plurality of pixel clusters based on one or more color values of the pixel, each pixel cluster of the plurality of pixel clusters corresponding to a respective data line of the plurality of data lines. The operations can include generating a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters. The operations can include identifying a respective set of line segments defining the respective data line associated with each image mask of the plurality of image masks by performing object detection on the image mask or an edge image derived from the image mask. The operations can include determining a plurality of pixel sets associated with the plurality of time series datasets based on the respective set of line segments associated with each image mask. The operations can include providing at least one pixel set of the plurality of pixel sets as input for a computing operation that is configured to process the at least one pixel set and return a processing result. The operations can include performing at least one task based on the processing result.

Yet another example of the present disclosure includes a method. The method can include accessing an image depicting a time series graph having a plurality of data lines representing a plurality of time series datasets. The method can include executing a clustering process to assign each pixel in the image to one of a plurality of pixel clusters based on one or more color values of the pixel, each pixel cluster of the plurality of pixel clusters corresponding to a respective data line of the plurality of data lines. The method can include generating a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters. The method can include identifying a respective set of line segments defining the respective data line associated with each image mask of the plurality of image masks by performing object detection on the image mask or an edge image derived from the image mask. The method can include determining a plurality of pixel sets associated with the plurality of time series datasets based on the respective set of line segments associated with each image mask. The method can include providing at least one pixel set of the plurality of pixel sets as input for a computing operation that is configured to process the at least one pixel set and return a processing result. The method can include outputting the processing result for display on a display device. Some or all of the method can be implemented by one or more processors.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE FIGURES

The patent or application file contains at least one drawing executed in color. Copies of this patent or patent application publication with color drawings will be provided by the office upon request and payment of any necessary fee. The present disclosure is described in conjunction with the appended figures:

FIG. 20 shows an example of computer program code for extracting time series information from an image and generating a forecast based thereon according to some aspects.

Figure 1:
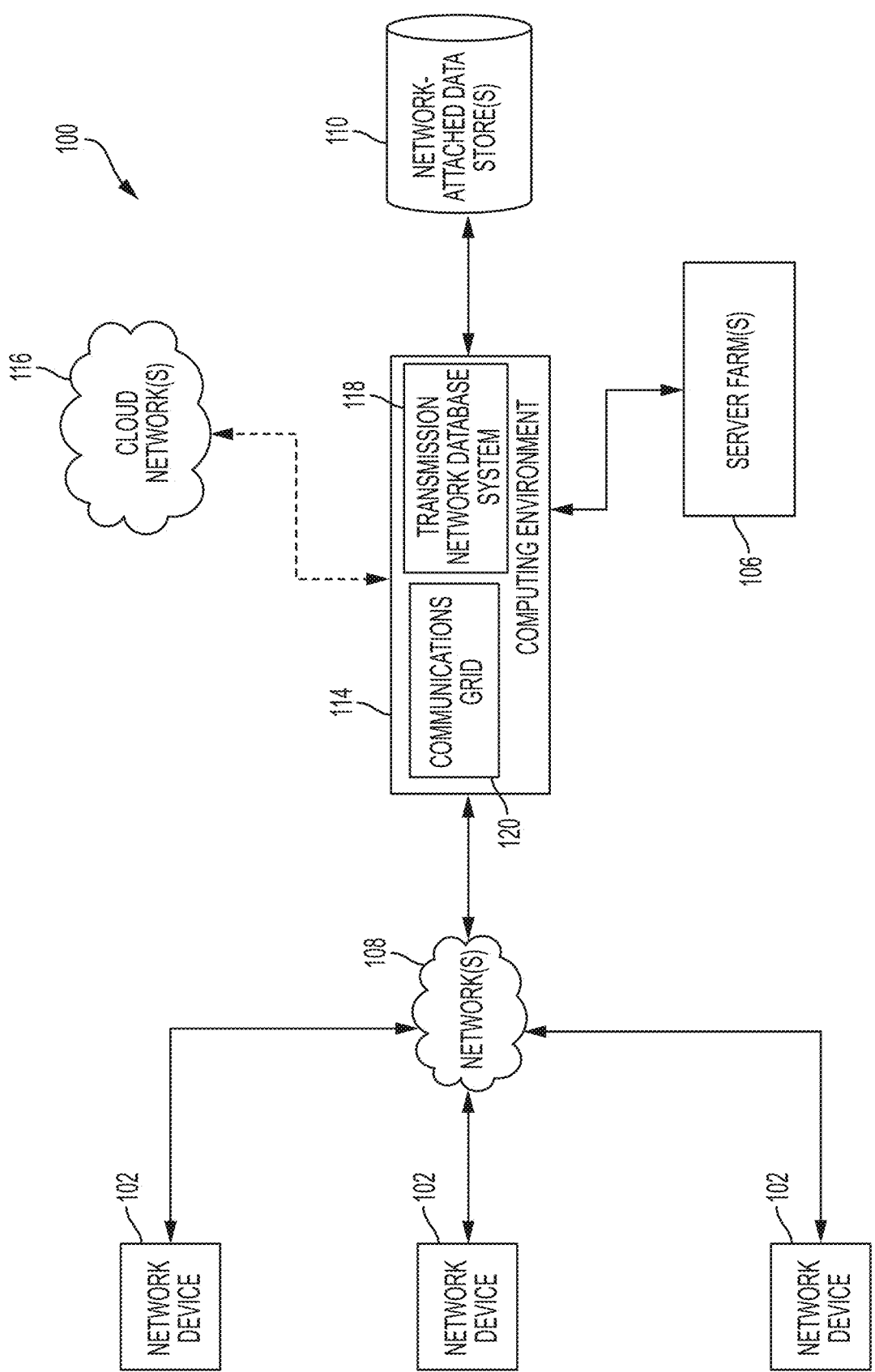
FIG. 1 depicts a block diagram of an example of a computing system according to some aspects.

In the appended figures, similar components or features can have the same reference label. Further, various components of the same type can be distinguished by following the reference label with a lowercase letter that distinguishes among the similar components. If only the first reference label is used in the specification, the description is applicable to any one of the similar components having the same first reference label irrespective of the lowercase letter.

DETAILED DESCRIPTION

Time series information is used in many industries for a variety of purposes. Typically, the time series information is stored as a dataset with magnitude values and timestamps for use in one or more computing operations. When the time series information is stored in this way as a dataset, it is relatively easy for a computing system to recognize and analyze the time series information. But in some scenarios, the time series information may be stored in other formats that are less digestible to a computer. For example, a user may operate the camera on a mobile phone take a photo of a time series graph printed on a physical surface (e.g., of a textbook, a magazine, or a newspaper) or output on another computer's screen, at which point the time series graph may be stored as a digital image on the user's mobile phone. The time series graph can include one or more data lines representing distinct time series. It can be challenging for a computer to recognize and make use of time series information embedded in such a digital image. The challenges around recognizing time series information embedded in a digital image can also make it difficult to perform real-time automated analysis of such time series information, for example in the case of robots or other autonomous systems that may use image data from cameras as inputs to perform various tasks.

Some examples of the present disclosure can overcome one or more of the abovementioned problems by applying computer vision and other image-processing techniques to derive time series information from a digital image. In particular, a system can receive a digital image of a time series graph containing one or more data lines representing one or more time series. The system may receive the digital image from a camera coupled to the system or from another source, such as an image repository accessible via the Internet. The system can then analyze the digital image to derive one or more pixel sets defining the one or more data lines depicted in the image. Because each pixel set defines a data line depicted in the image, the pixel sets can be conceptualized as "pseudo time-series datasets" that are different from, but that can serve as a proxy for, the underlying time series information shown in the original image. The pixel sets can serve as a proxy for the underlying time series because the pixel sets will generally have the same shape as the underlying time series, even though their coordinate systems are different. Having derived the one or more pixel sets from the image, the system can provide the one or more pixel sets as input to subsequent computing operations, such as a predictive forecasting operation or an anomaly detection operation. As a result, the system is capable of recognizing time series information in a digital image that it may otherwise be incapable of recognizing, and the system is capable of performing computing operations on corresponding pixel sets that it may otherwise be incapable of performing to derive insights associated with the time series information. The ability to extract and process such information from digital images may also allow robots and other computer systems to automatically derive relevant information from digital images for use in making autonomous decisions.

In some examples, the data lines in the digital image can be formed from pixels. Each pixel can have color values, such as red, blue, and green (RBG) values. If all of the pixels forming an individual data line in the digital image have the same color or similar colors, the data line can be recognized and distinguished from the other data lines based on the pixel color values. One way in which this delineation can be made is through a clustering process. In particular, the system can execute a clustering process that assigns the pixels in the digital image into pixel clusters according to their color (e.g., RGB) values. A pixel cluster can be a group of pixels that have the same or similar color values and thus can represent the same data line depicted in the digital image. Each pixel cluster can correspond to a different data line in the digital image.

After assigning each pixel in the digital image to its corresponding pixel cluster, the system can generate image masks corresponding to the pixel clusters. An individual image mask can be generated for each individual pixel cluster based on one or more attributes of that pixel cluster. The image mask can be a digital image that portrays only the single data line related to the pixel cluster, without the other data lines in the digital image. The system may then execute an edge-detection technique on each image mask to sharpen their line edges. The image resulting from applying the edge-detection process to an image mask can be referred to as an "edge image."

Next, the system can execute an object detection technique on each image mask or edge image to identify a set of line segments defining the data line depicted in the image. An example of the object detection technique can include a Hough transform. Each line segment can extend from a starting data point defined by starting coordinates (e.g., an X coordinate and a Y coordinate) to an ending data point defined by ending coordinates. Depending on the quality of the object detection technique, the derived line segments may not be continuous and may be partially overlapping with each other, thus it is possible for the collected coordinates to be repeated or discontinuous over the X and Y axes. That is, there may be breaks between adjacent line segments, particularly near sharp edges or discontinuities in the data line. So, the system can execute an interpolation process between disconnected, adjacent pairs of line segments to estimate pixel data (e.g., the locations of missing pixels) between the adjacent line segments.

Based on the line segments and interpolated pixel data derived from an image mask or an edge image, the system can then generate a dataset that includes the pixel coordinates for the set of pixels representing the data line in the image. This dataset can be referred to as a pixel set. The system can repeat this process for each image mask or edge image to generate a respective pixel set representing the data line depicted in the image. Using this process, the system can recognize the data lines in the original digital image and determine pixel sets forming the data lines. The pixel sets can be different from, but serve as proxies for, the underlying time series information in the original digital image.

Next, the system can provide the pixel sets as input to one or more computing operations, which can process them and return a processing result. For example, the computing operations can include a forecasting operation for generating a predictive forecast based on a pixel set, where the processing result can be a predictive forecast. The system can receive the processing result and generate a new image in which the predictive forecast is appended to the data line from the original image, so that the end user can view the original data line along with how the data line is predicted to continue over a future time interval. Other examples of the computing operations can include a search operation for searching the pixel set based on a search criteria, a decomposition operation for decomposing the pixel set into one or more subcomponents, a feature extraction operation for extracting a feature from the pixel set, an anomaly detection operation for detecting an anomaly based on the pixel set, and other time-series analysis operations. The processing results may be returned in a textual format, a verbal format (e.g., with speech output), in image format, or any combination thereof.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-12 depict examples of systems and methods usable for recognizing data lines from images of time series graphs according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100.

The computing environment 114 may include one or more other systems. For example, computing environment 114 may include a database system 118 or a communications grid 120. The computing environment 114 can include one or more processing devices (e.g., distributed over one or more networks or otherwise in communication with one another) that may be collectively be referred to herein as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in recognizing data lines from images of time series graphs, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for recognizing data lines from images of time series graphs to a network-attached data store 110 for storage. The computing environment 114 may later retrieve the data from the network-attached data store 110 and use the data to recognize data lines from images of time series graphs.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate a time series or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for recognizing data lines from images of time series graphs.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for recognizing data lines from images of time series graphs. For example, the computing environment 114, a network device 102, or both can implement one or more versions of the processes discussed with respect to any of the figures.

Figure 2:
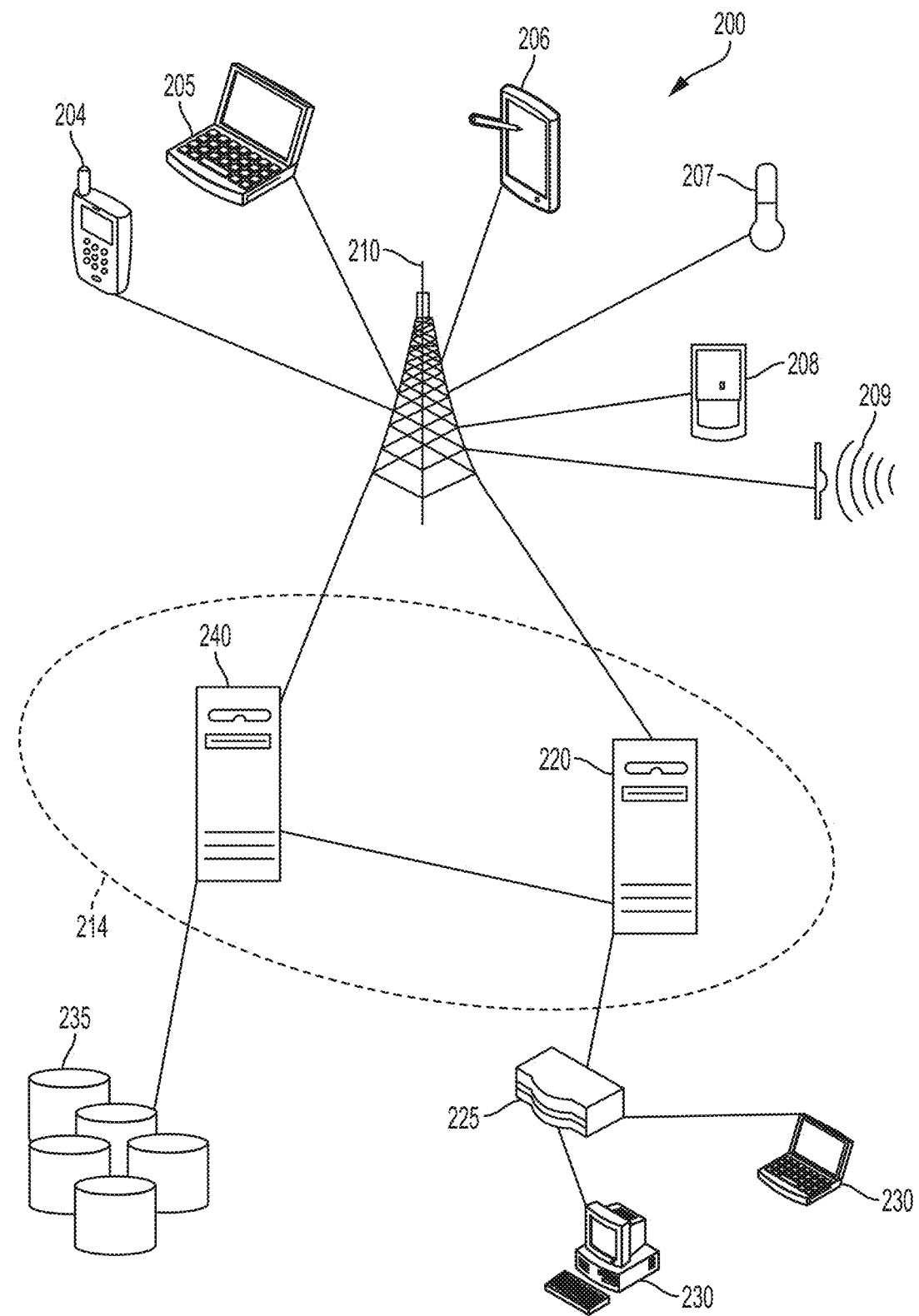
FIG. 2 depicts an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, the computing environment 214 can perform a pre-analysis of the data, where the pre-analysis can include determining whether the data (e.g., images) is in a correct format and, if not, reformatting the data into the correct format.

Figure 3:
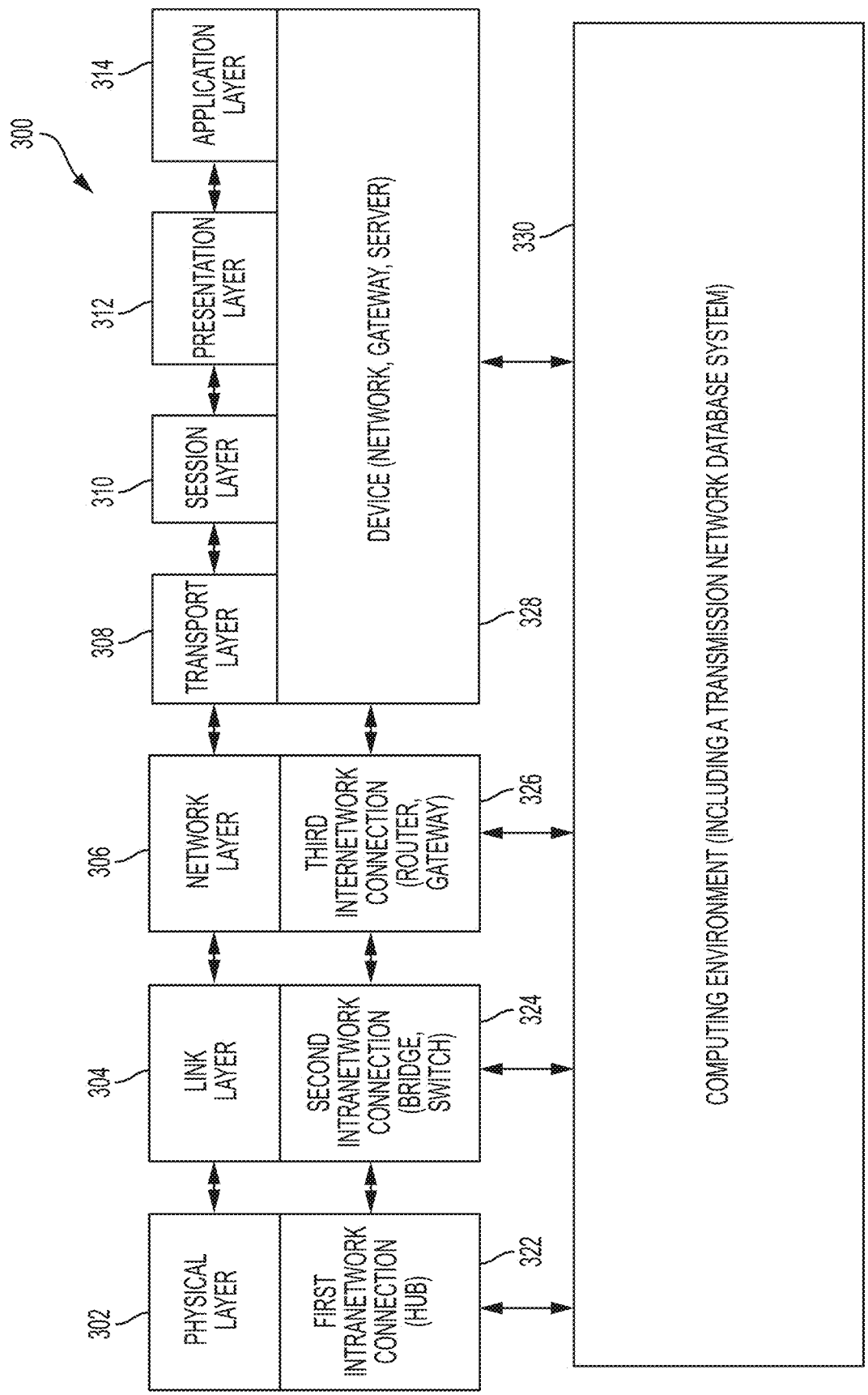
FIG. 3 depicts a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network.

In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for recognizing data lines from images of time series graphs, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for recognizing data lines from images of time series graphs.

Figure 4:
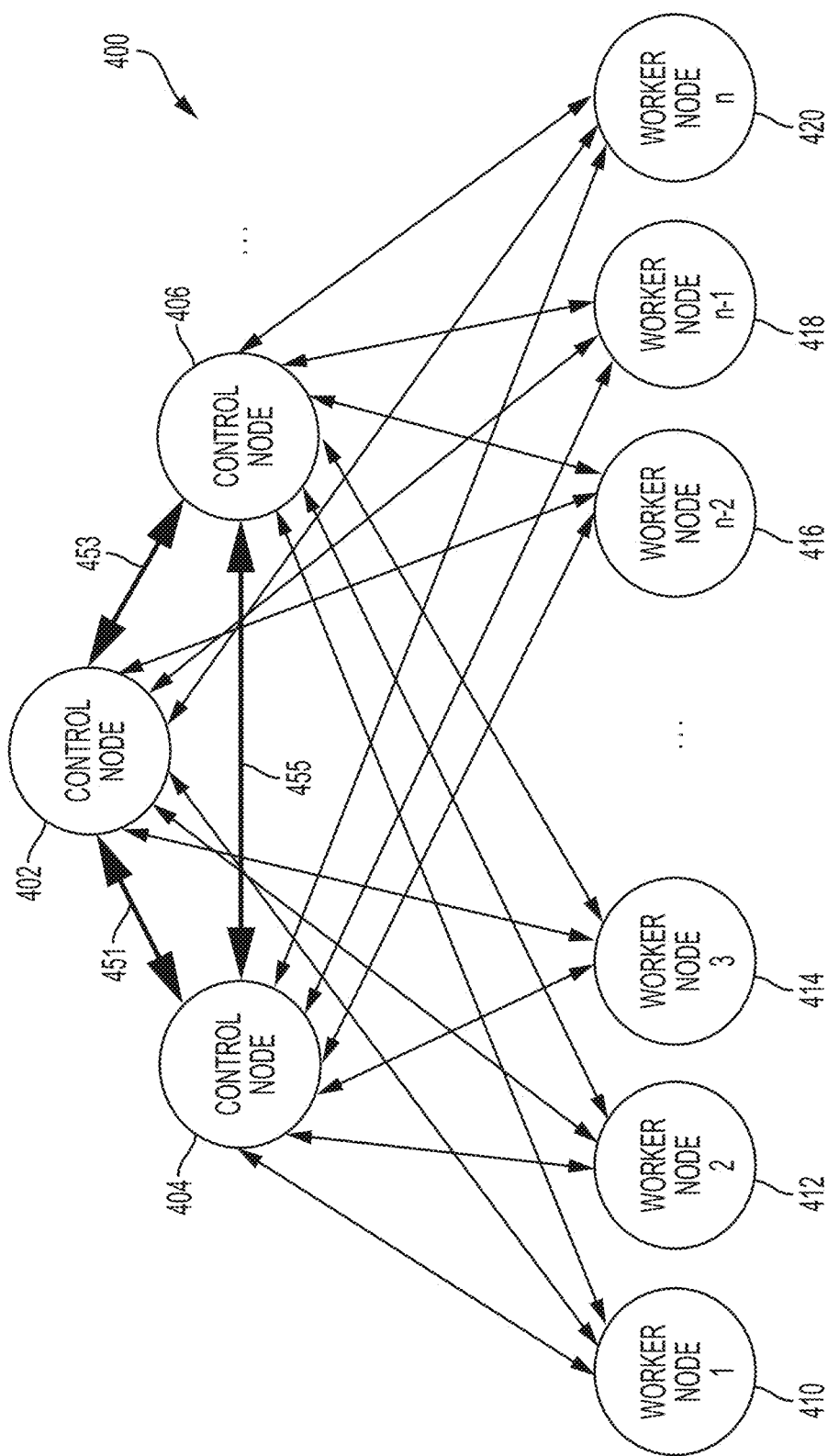
FIG. 4 depicts a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to recognizing data lines from images of time series graphs. The project may include the data set. The data set may be of any size and can include images. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for recognizing data lines from images of time series graphs can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may recognize data lines from images of time series graphs using at least a portion of an image that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to recognize data lines from images of time series graphs.

Figure 5:
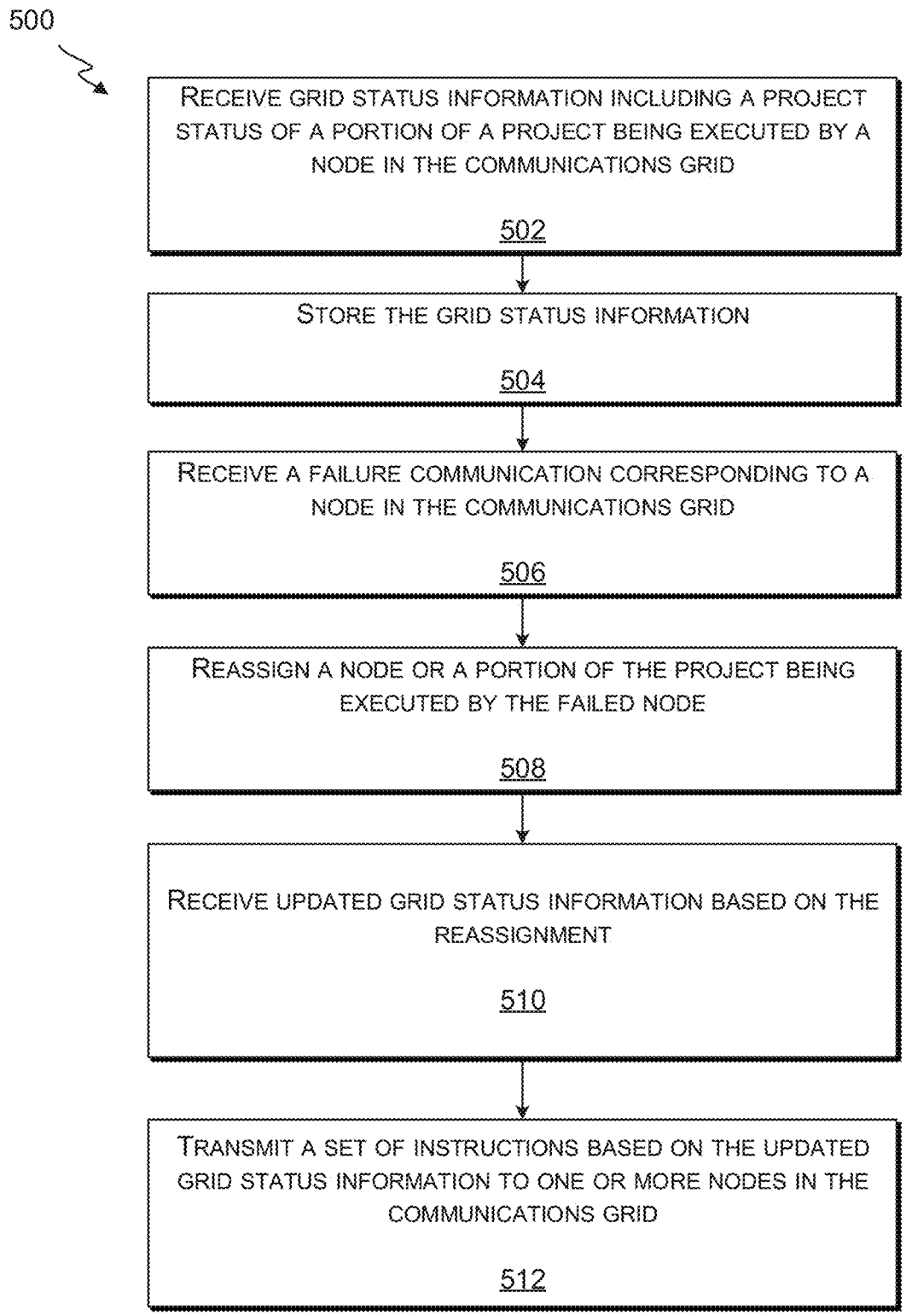
FIG. 5 depicts a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
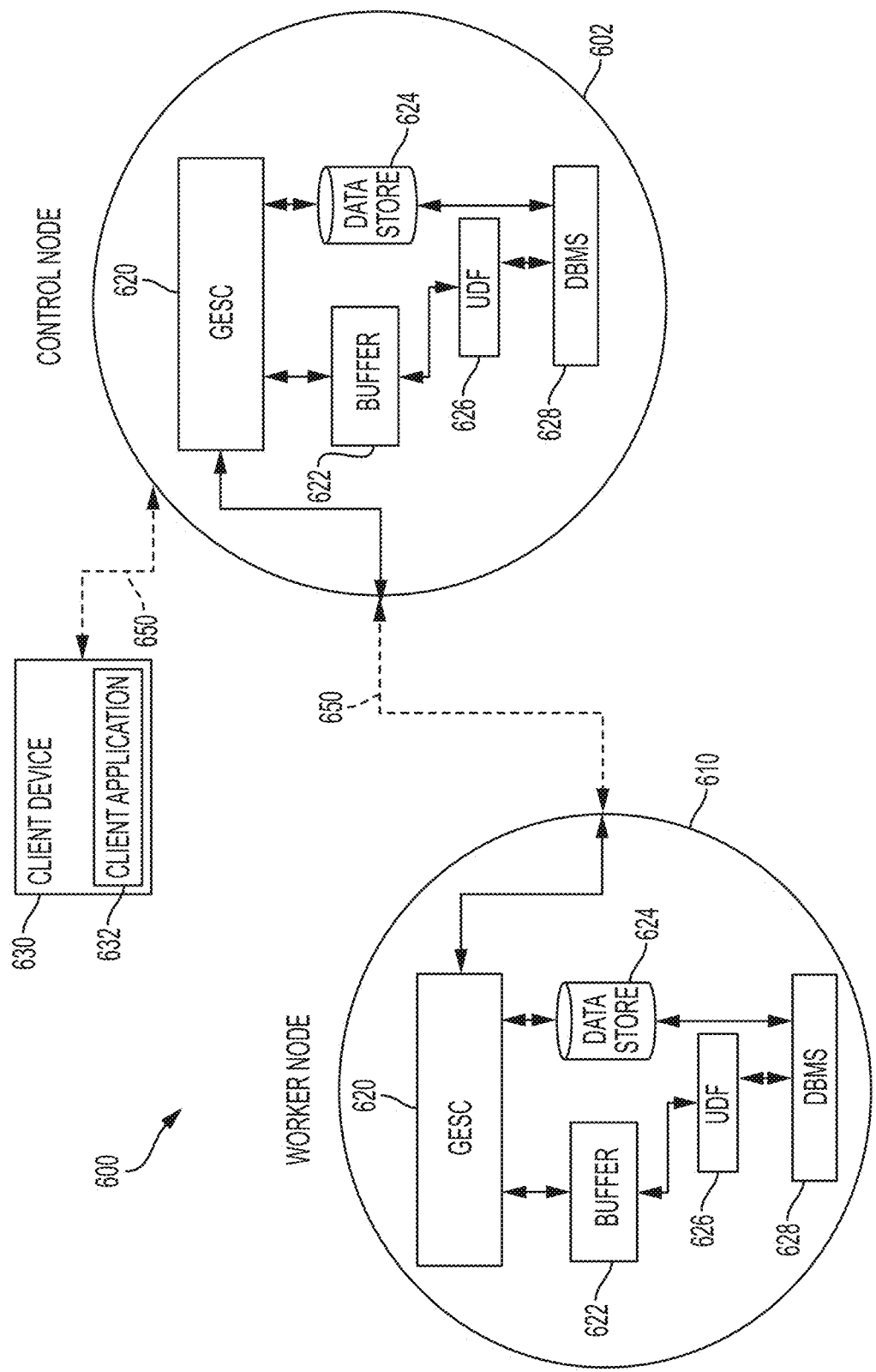
FIG. 6 depicts a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
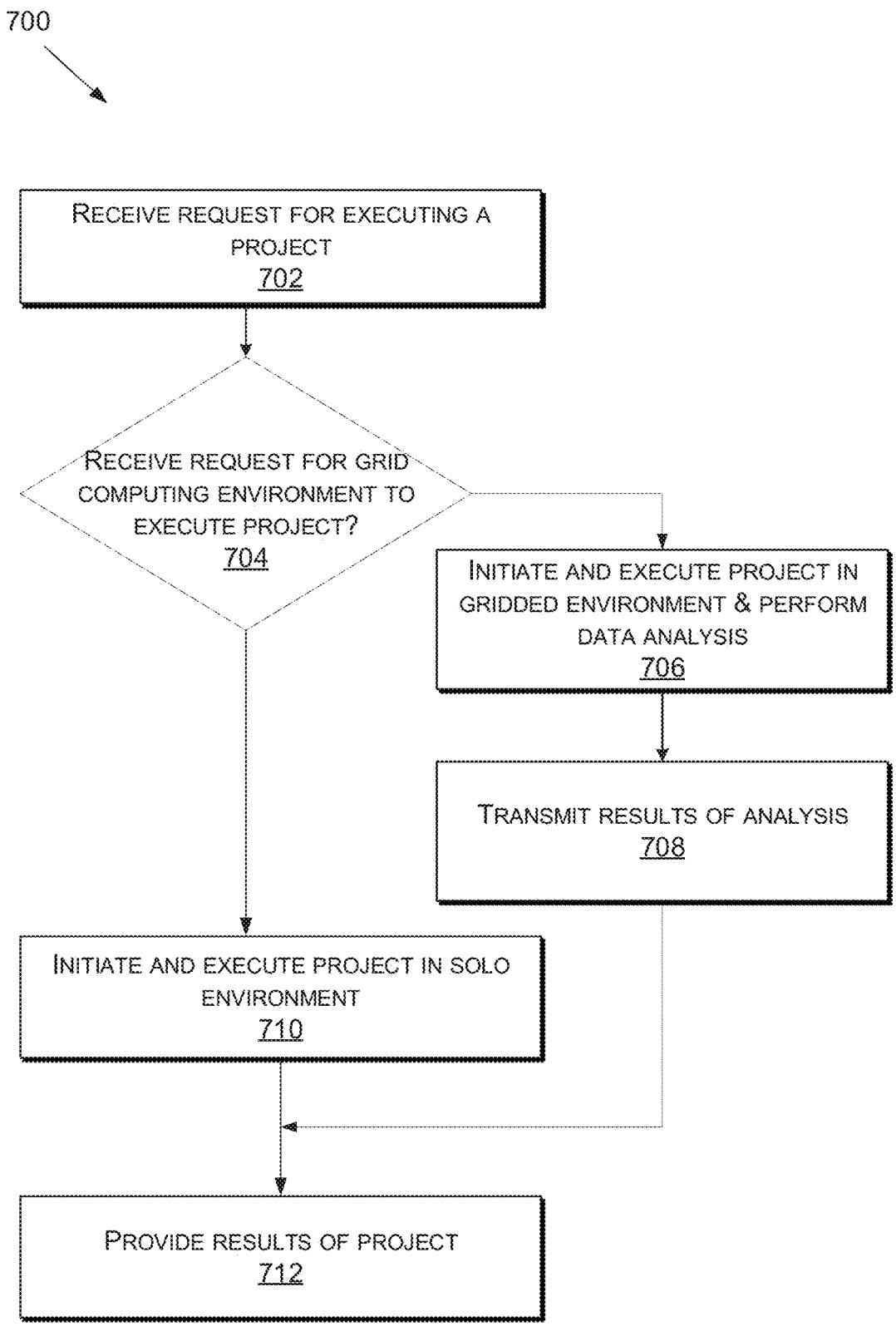
FIG. 7 depicts a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
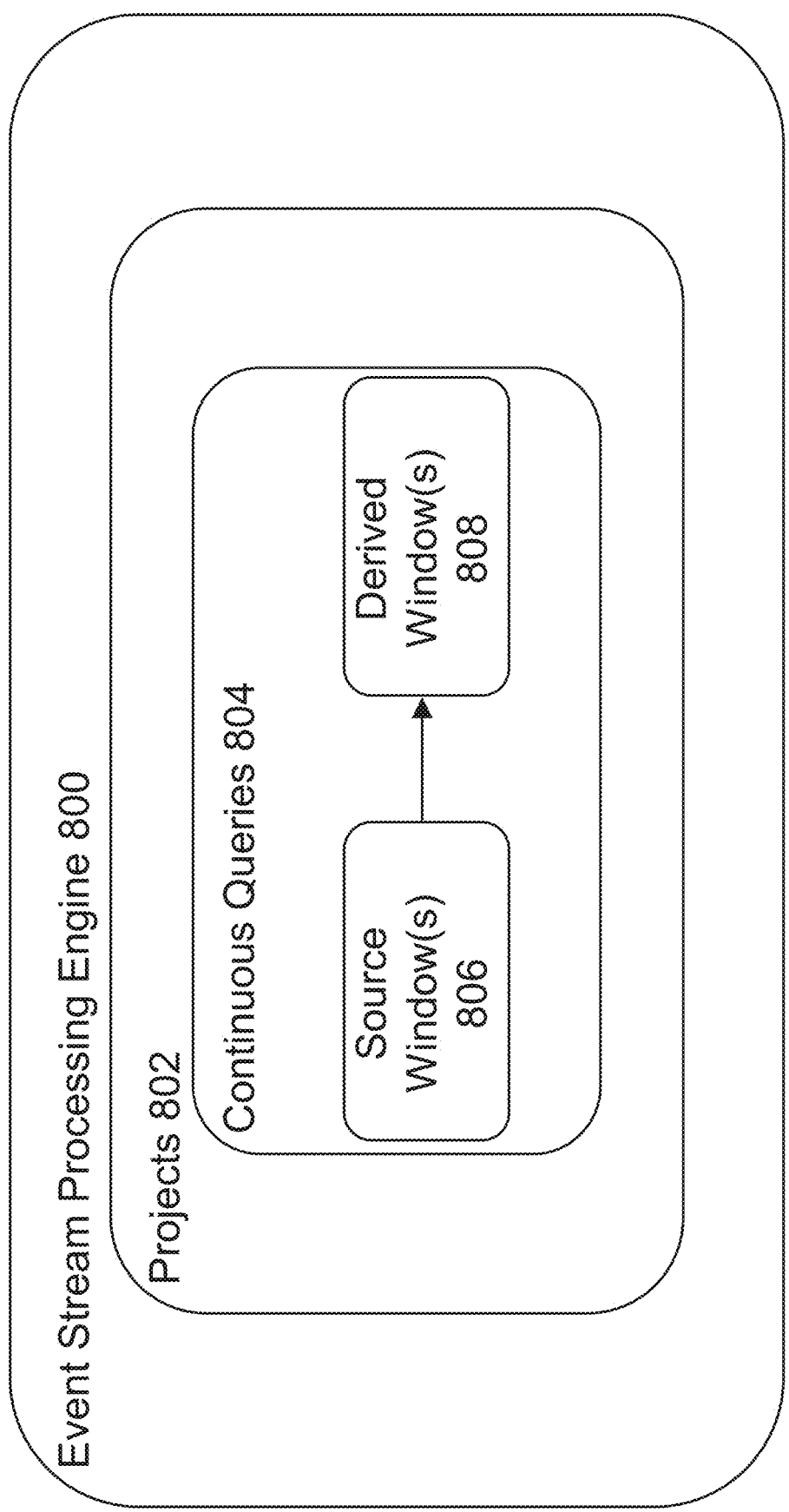
FIG. 8 depicts a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
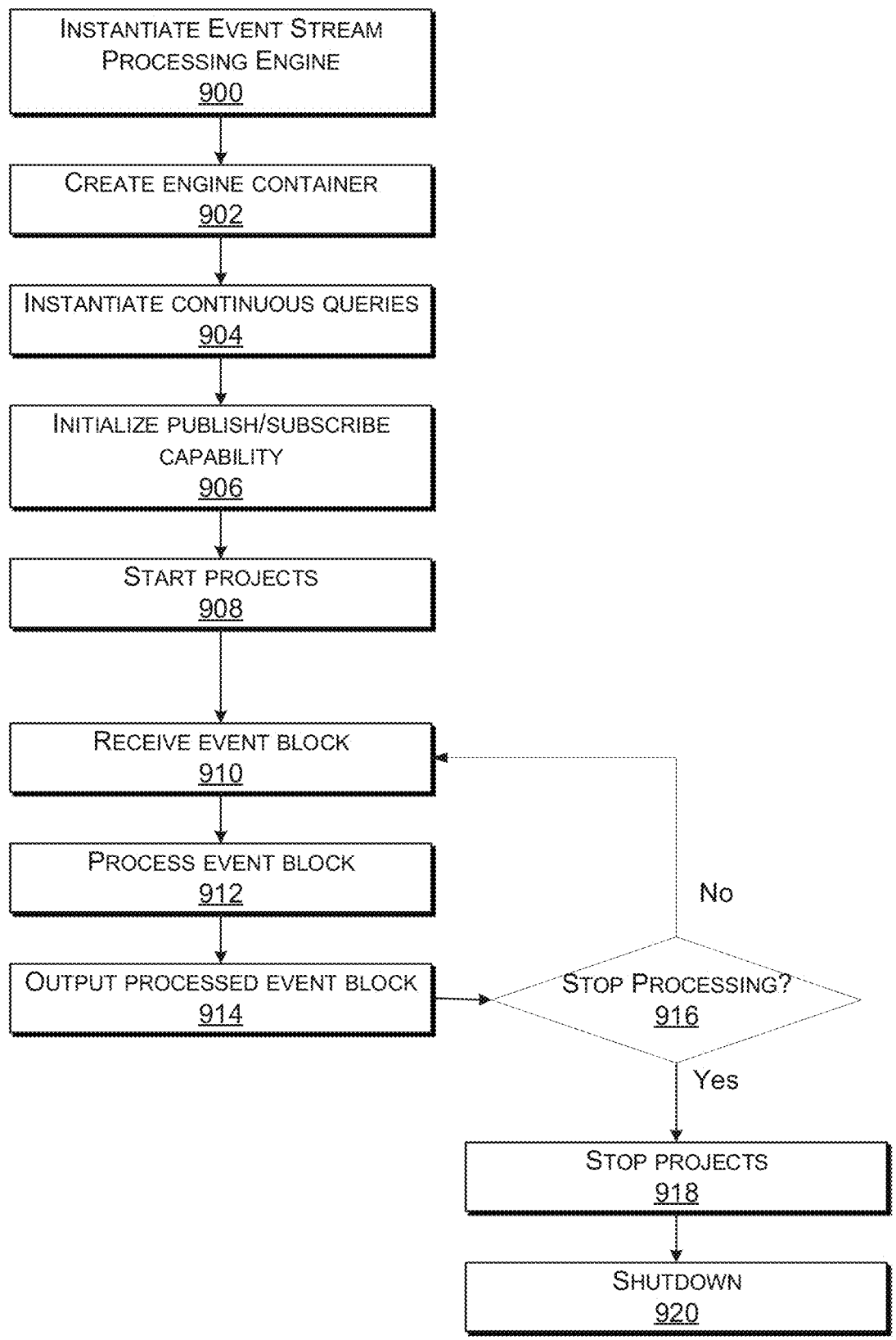
FIG. 9 depicts a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
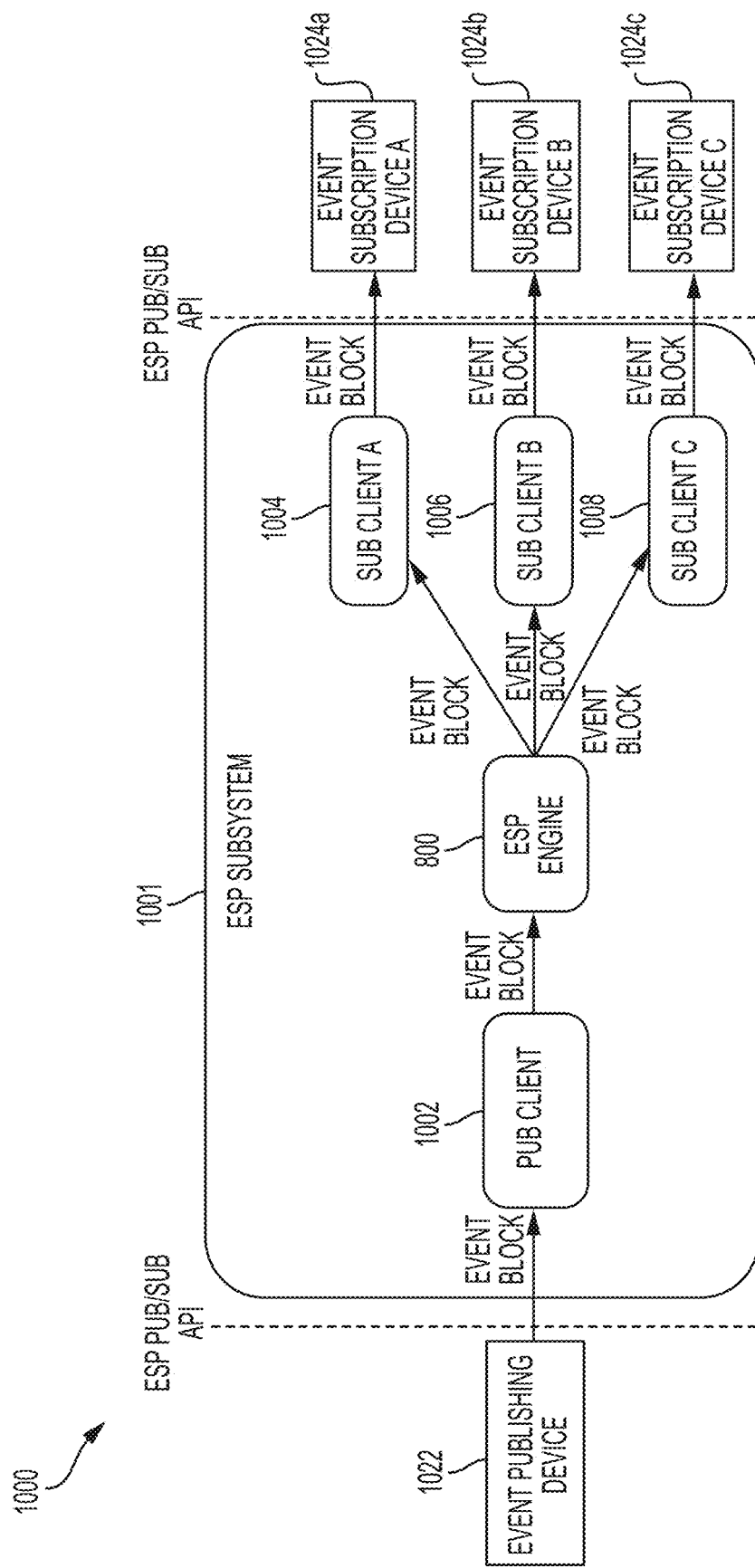
FIG. 10 depicts a block diagram of an ESP system interfacing between a publishing device and multiple event subscribing devices according to some aspects.

FIG. 10 is a block diagram of an ESP system 1000 interfacing between publishing device 1022 and event subscription devices 1024*a-c* according to some aspects. ESP system 1000 may include ESP subsystem 1001, publishing device 1022, an event subscription device A 1024*a*, an event subscription device B 1024*b*, and an event subscription device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024*a*, event subscription device B 1024*b*, and event subscription device C 1024*c*. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024*a*, event subscription device B 1024*b*, and event subscription device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024*a*, event subscription device B 1024*b*, and event subscription device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing devices of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024*a* using the publish/subscribe API. Subscribing client B 1006 may be started by an event subscription application B executing at event subscription device B 1024*b* using the publish/subscribe API. Subscribing client C 1008 may be started by an event subscription application C executing at event subscription device C 1024*c* using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
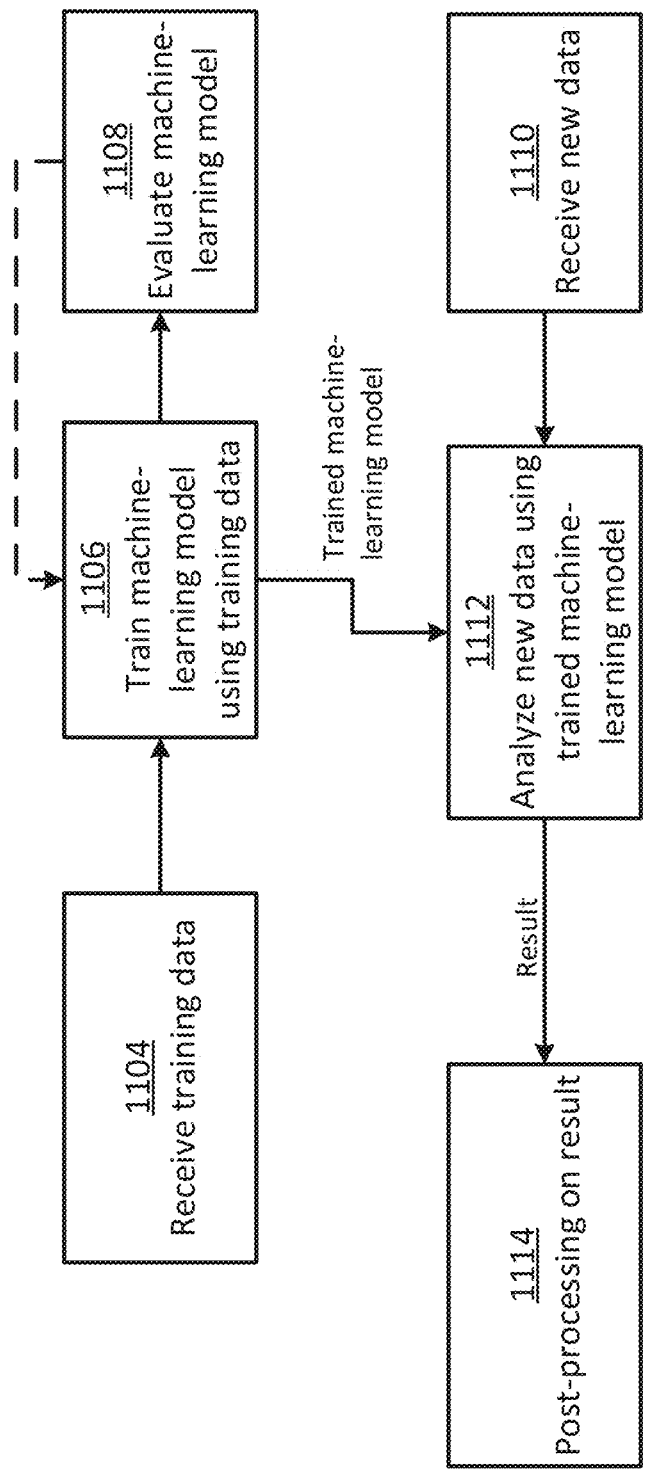
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. An evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
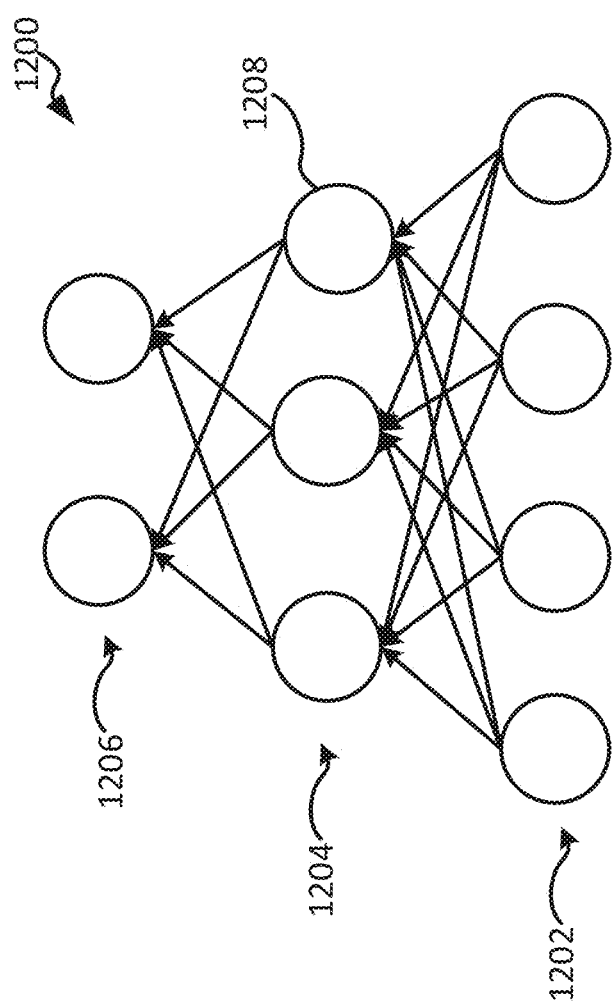
FIG. 12 is a node-link diagram of an example of a neural network according to some aspects.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and quickly executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, thermal processing mitigation, processing speed improvements, data communication speed improvements, and/or data efficiency targets and improvements throughout various parts of the system when compared to a homogeneous computing architecture that employs CPUs for general purpose computing.

Figure 13:
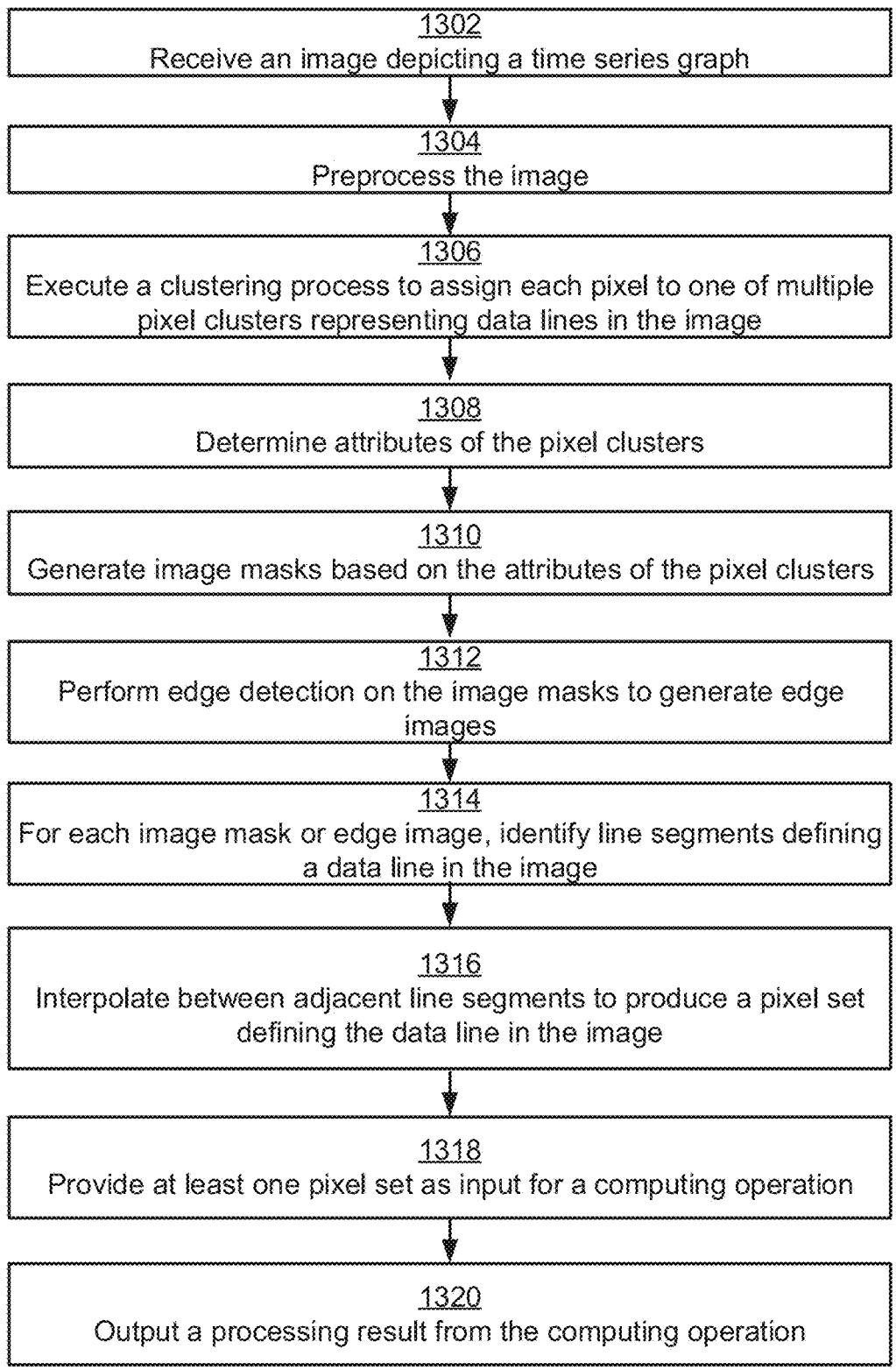
FIG. 13 is a flow chart of an example of a process executable by a processor for extracting a pixel set associated with time series information from images according to some aspects.

FIG. 13 a flow chart of an example of a process executable by a computing system for recognizing data lines from images (i.e., digital images) of time series graphs according to some aspects. Although FIG. 13 shows a certain number and sequence of operations, other examples may include more operations, fewer operations, different operations, or a different order of the operations shown in FIG. 13.

At block 1302, the computing system receives an image depicting a time series graph. For example, the computing system receive the image from a local memory, from a remote server such as a cloud server, or from a remote database. In some examples, the computing system may be coupled to a camera for receiving the image and coupled to a display device for displaying the image. For example, the computing system may be a mobile phone, tablet, or laptop computer with a build-in camera usable to capture the image and a built-in display device for displaying the captured image.

Figure 14:
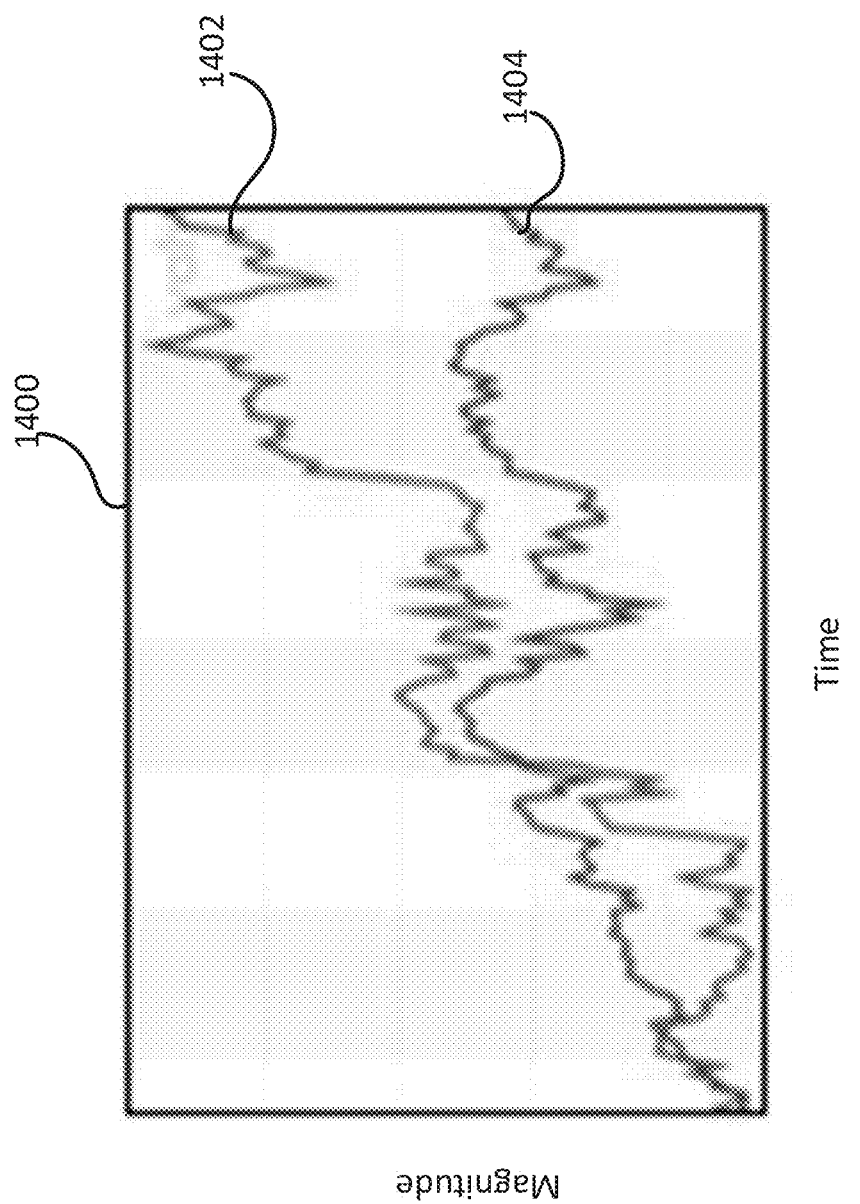
FIG. 14 shows an example of an image of a time series graph that includes multiple data lines according to some aspects.

The time series graph may include one or more data lines that each represent a distinct time series. For example, the time series graph may represent sensor measurements over time for multiple IOT devices, where each IOT device's measurements are represented by its own distinct data line in the time series graph. The data lines within the time series graph may have visual characteristics that are different from one another, such that the data lines may be detected within the image using computer vision technology. For example, the data lines may be different colors such that the pixels defining the data lines in the image may have different RGB color values. This may allow a color-based clustering process to be used on the image, as described in greater detail below. One example of such an image is shown in FIG. 14, which depicts a time series graph 1400 with two data lines 1402-1404 representing demand for two different products over a timespan.

At block 1304, the computing system preprocesses the image by applying one or more image-processing techniques on the image, so as to generate a preprocessed image. For example, the computing system can execute an image-dilation technique to increase the line thickness of the data lines in the original image such that the preprocessed image has thicker data lines than the original image. Additionally or alternatively, the computing system can execute an image-resizing technique to downsize the original image into a smaller image such that the preprocessed image has fewer total pixels than the original image. As one specific example, the original image may include 347,000 pixels. This image may be too large to efficiently analyze in a timely manner. So the computing system can downsize the image to generate a smaller version of the original image that contains, for example, 10,000 pixels. The computing system may apply other image-processing techniques as well to preprocess the image.

At block 1306, the computing system executes a clustering process to assign each pixel in the image (e.g., the preprocessed image) to one of multiple pixel clusters representing data lines. A clustering process may be used on the image to produce pixel clusters that each define a single data line within the image. That is, the number of pixel clusters can be equal to the number of data lines depicted in the image. For example, if there are six data lines in the image, the clustering process may generate six pixel clusters corresponding to the data lines. One example of such a clustering process may be Density-Based Spatial Clustering of Applications with Noise (DBSCAN). This is a color-based clustering process that can create the pixel clusters based on the colors of the pixels in the image. DBSCAN does not need to have a predefined number of clusters and therefore may be desirable for this application. But any other suitable clustering process may be used to assign pixels in the image to pixel clusters corresponding to the data lines.

In some examples, the clustering process may identify the RGB values of each pixel in the image. For example, each pixel in the image can include a set of RGB color values. Each pixel may then be added to the pixel cluster that corresponds to the RBG values of the pixel. In this way, the clustering process may define multiple pixel clusters and assign one or more pixels from the image to each pixel cluster.

Figure 15:
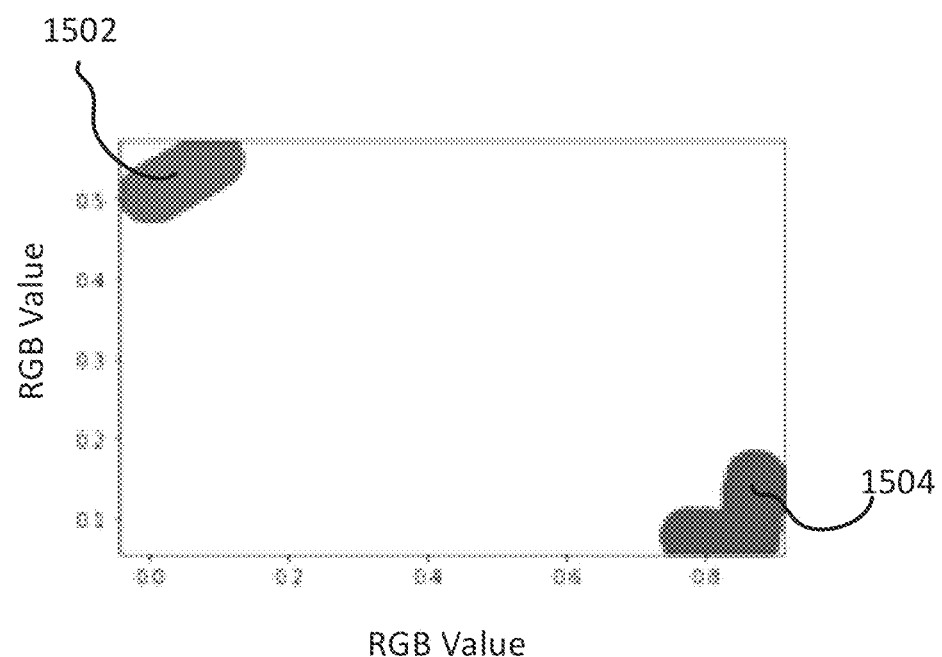
FIG. 15 shows an example of a result of a clustering process applied to the image of FIG. 14 according to some aspects.

One example of the pixel clusters 1502-1504 is shown in FIG. 15. As shown, there are two pixel clusters 1502-1504 that correspond to the two data lines 1402-1404 of FIG. 14. The X axis and Y axis in FIG. 15 represent a first RGB value and a second RGB value, respectively, where the axis values are normalized. In this example, DBSCAN was used to automatically determine the number of clusters. Since the number of clusters can equal the number of time series in the original image, the computer system can know that there are two time series in the image based on this process.

In some examples, the clustering process may produce enough pixel clusters so that each pixel in the image is included within a pixel cluster. For example, the clustering process may generate a pixel cluster for a background color (e.g., white) of the image and may generate other pixel clusters for other visual elements in the image that are distinct from the data lines. As a result, there may be more total pixel clusters than there are data lines in the image. In other examples (such as the one described above), background colors and other graphical elements may be ignored such that there are an equal number of pixel clusters to the total number of data lines in the image.

Figure 21:
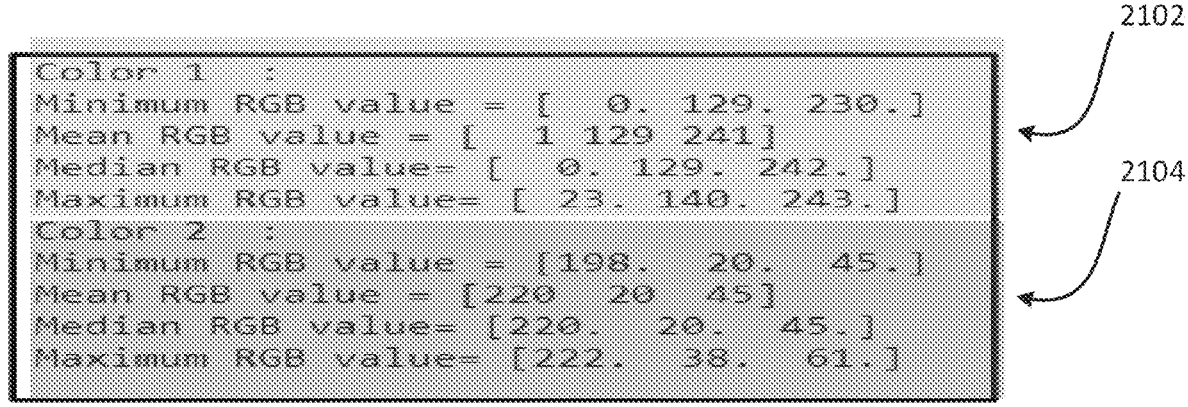
FIG. 21 shows an example of cluster attributes according to some aspects.

At block 1308, the computing system determines attributes of the pixel clusters. The attributes may include statistical values in some examples. For example, the computing system may determine RGB statistics of the pixels in a pixel cluster, such as mean, median, maximum, and minimum values of the RGB color values across all pixels assigned to the pixel cluster. One example of such RGB statistics is shown in FIG. 21. In FIG. 21, box 2102 includes examples of RGB statistics for pixel cluster 1502 of FIG. 15 and box 2104 includes examples of RGB statistics for pixel cluster 1504 of FIG. 15. The computing system may compute these statistics after the pixels in the image are all assigned to their respective pixel clusters. In some examples, the RGB statistics may define an upper bound value and a lower bound value for each color in a pixel cluster.

At block 1310, the computing system may generate image masks based on the attributes of the pixel clusters. In particular, the computing system can generate an image mask associated with a pixel cluster based on the determined attributes for that pixel cluster, where the image mask depicts the data line associated with the pixel cluster. The computing system can repeat this process for each pixel cluster to generate multiple image masks corresponding to the multiple data lines in the image.

Figure 16:
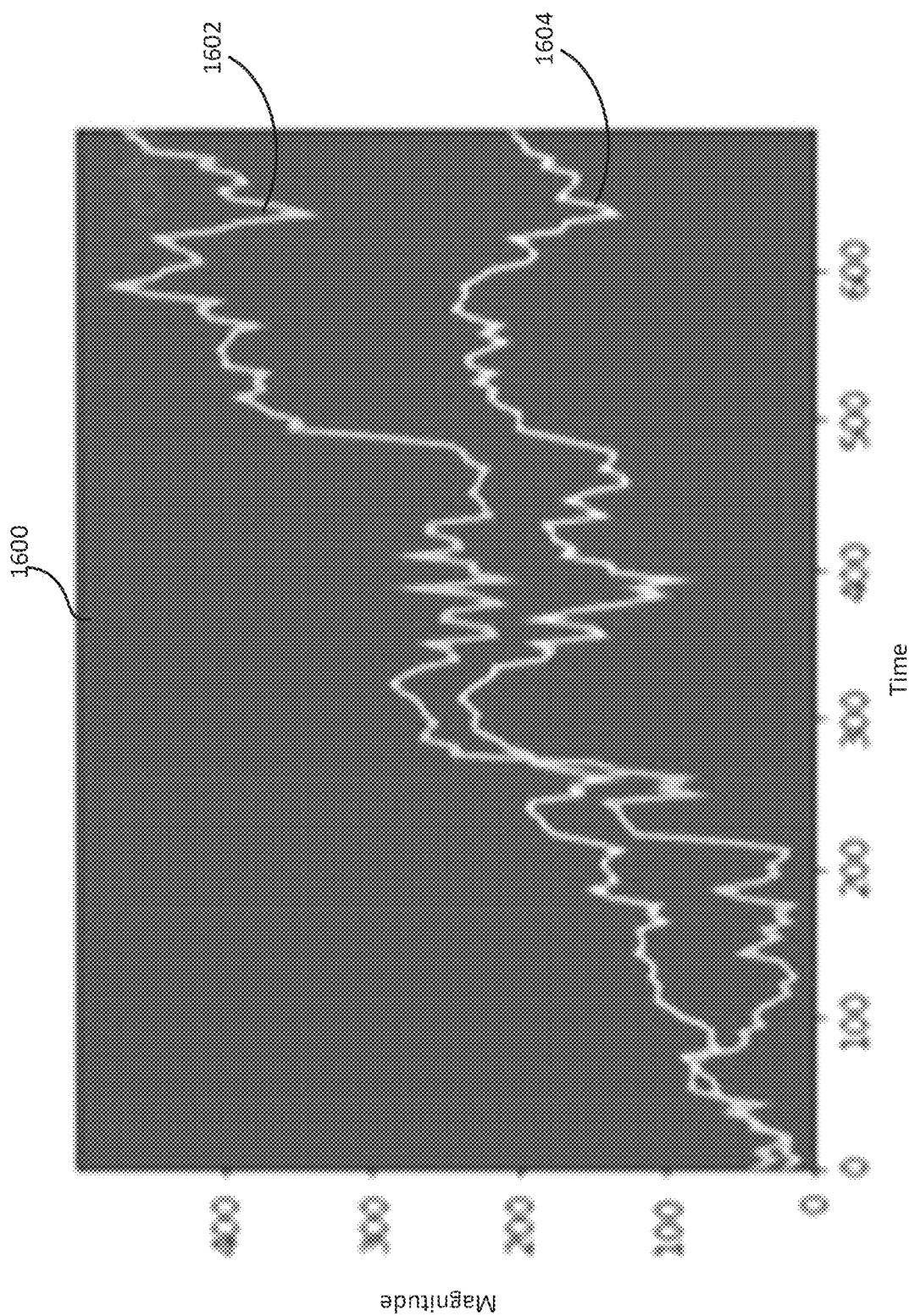
FIG. 16 shows an example of a reformatted image according to some aspects.
Figure 17:
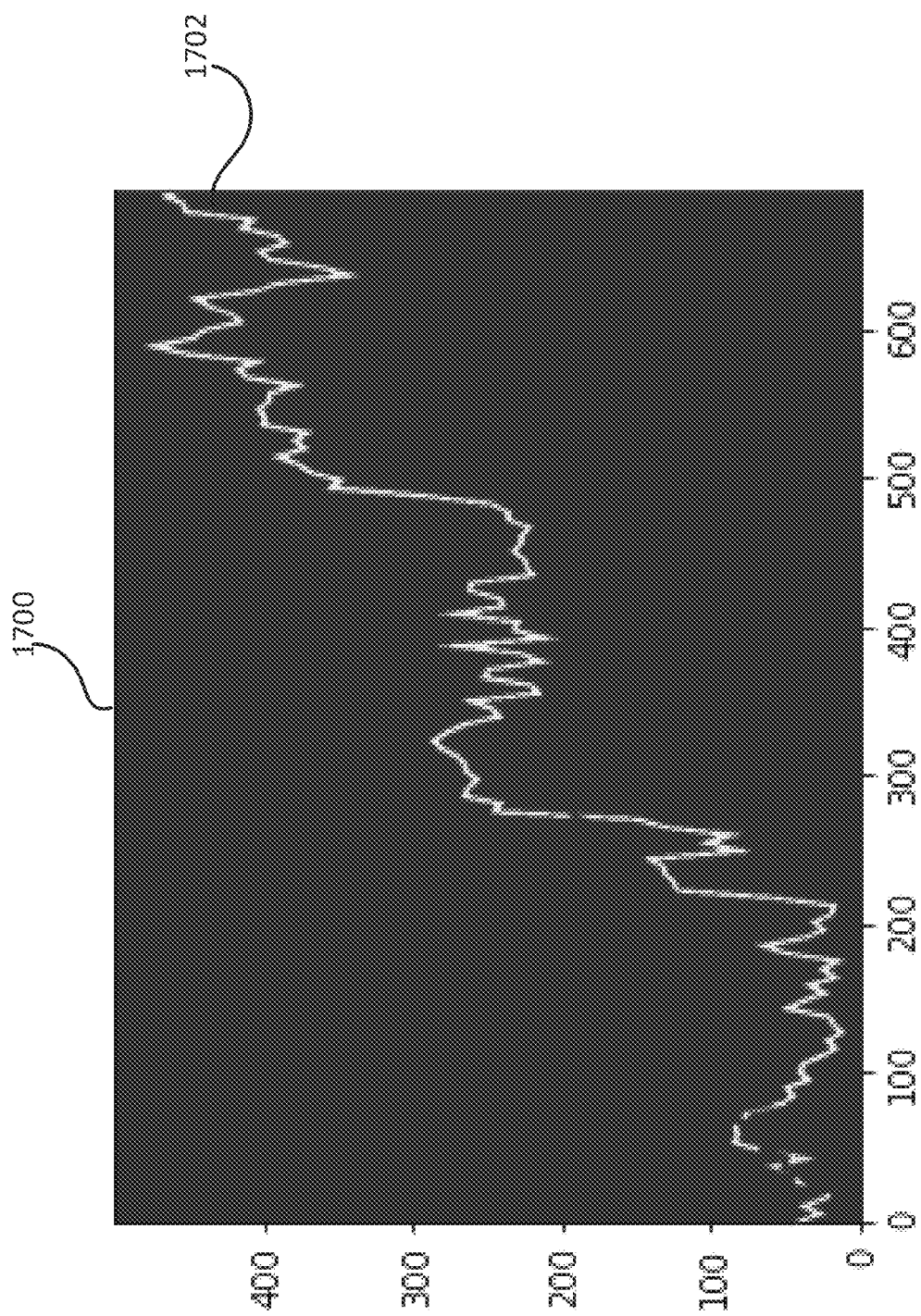
FIG. 17 shows an example of an image mask according to some aspects.

To generate the image masks, in some examples the computing system can convert the image from an RGB format into a huge, saturation, value (HSV) format to produce a reformatted image. One example of such a reformatted image 1600 in an HSV format is shown in FIG. 16, where lines 1602-1604 correspond to the data lines 1402-1404 of FIG. 14. The computing system may convert the image from the RGB format to the HSV format because HSV is less sensitive to external lighting changes. After converting the image into the HSV format, the computing system can then determine HSV ranges defining the data lines depicted in the reformatted image based on the attributes of the pixel clusters. Each HSV range can span multiple HSV values that define a respective data line depicted in the reformatted image. The computing system can then generate the image masks based on the HSV ranges, where each image mask may only include the HSV values in one of the HSV ranges and thus only depict one of the data lines in the image. One example of such an image mask 1700 is shown in FIG. 17, where line 1702 corresponds to data line 1402 of FIG. 14. This image mask 1700 was generated based on the RGB upper bound (23, 140,243) and the RGB lower bound (0, 129, 230) shown in box 2102 of FIG. 21. This RGB value range is converted to the HSV value range to generate the image mask 1700. Using this process, a separate image mask can be generated for each colored data line in the image. Thus, each image mask can be generated to depict a single data line based on the color attributes of the corresponding pixel cluster.

Figure 22:
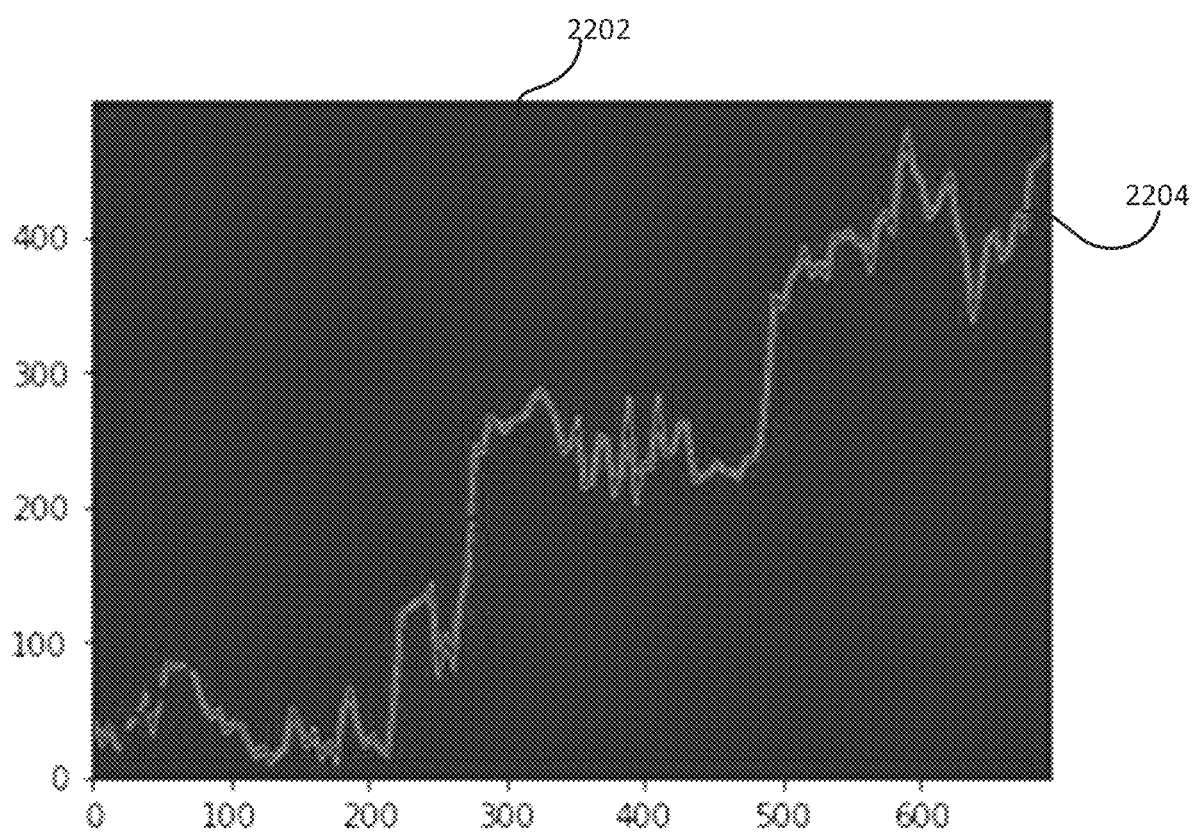
FIG. 22 shows an example of an edge image according to some aspects.

In block 1312, the computing system performs edge detection on the image masks to generate edge images in which the edges of the data lines are more apparent, which may help with subsequent operations. For example, the computing system can apply one or more edge detection algorithms (e.g., the Canny edge detector function) to the image masks to produce edge images with sharper or thicker lines than are present in the image masks. The edge images may be separate and distinct from the image masks. An example of such an edge image 2202 is shown in FIG. 22, whereby line 2204 corresponds to the line 1702 of the image mask 1700 in FIG. 17.

Figure 18:
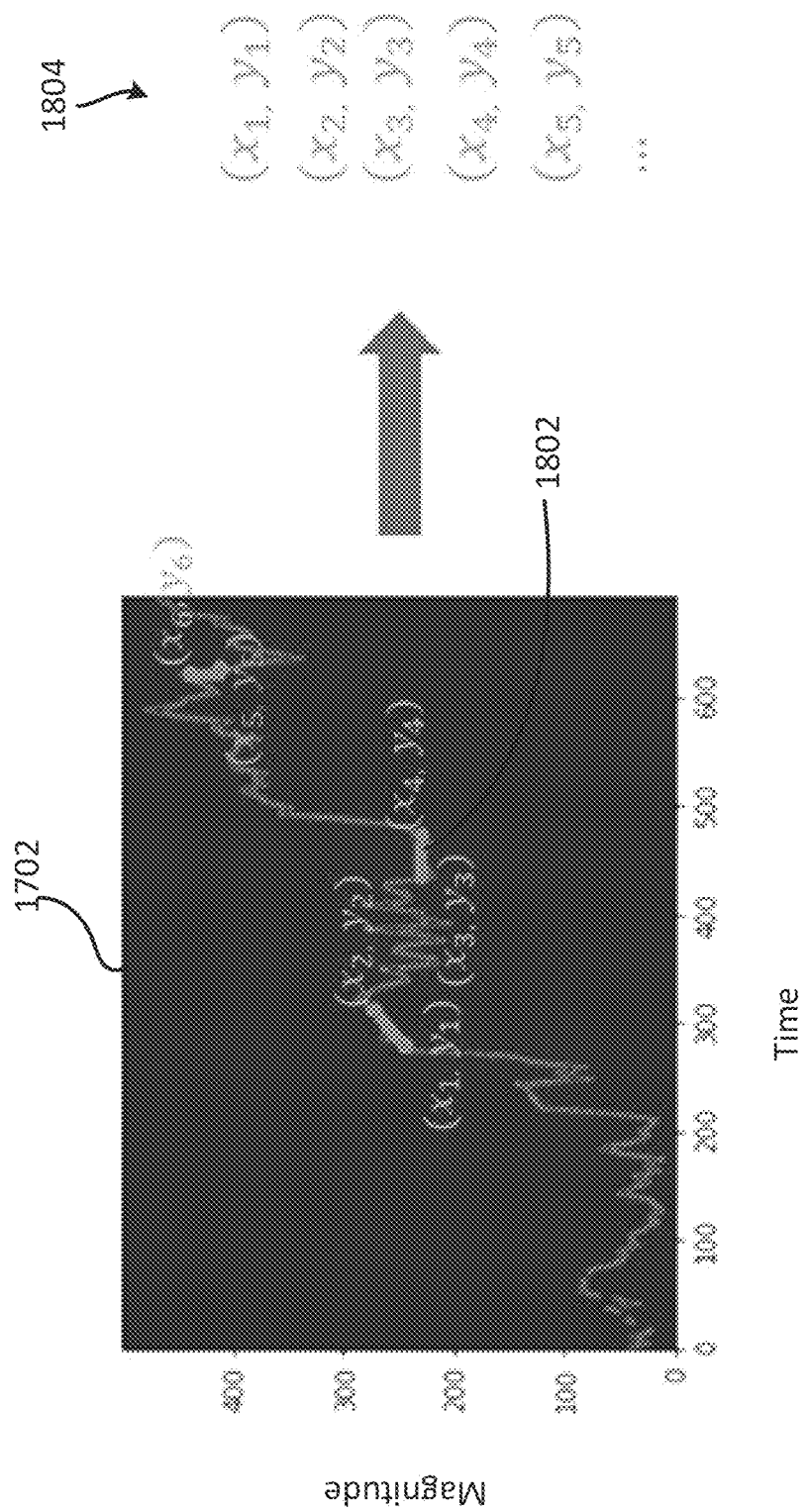
FIG. 18 shows an example of line segments according to some aspects.

In block 1314, the computing system identifies the line segments defining a data line in each image mask or edge image. For example, the computing system can identify a first set of line segments identifying a first data line depicted in a first image mask or a first edge image. The computing system can identify a second set of line segments identifying a second data line depicted in a second image mask or a second edge image. Etc. One example of such line segments 1802 is shown in FIG. 18, where the line segments 1802 are defined by end pixels 1804, and where the collection of line segments roughly define the data line 1402 of FIG. 14.

To identify the line segments for a given image mask or an edge image, the computing system can apply an object detection algorithm to the image. One example of the object detection algorithm can include a Hough transform, which can detect features (e.g., data points) of the data line. Other types of object detection algorithms may additionally or alternatively be used.

In one specific example, the computing system may identify a respective set of line segments defining a respective data line in each image mask or edge image. To do so, the computing system can determine the coordinates of starting pixels and ending pixels defining the line segments, where each line segment extends from a starting pixel at a starting coordinate to an ending pixel at an ending coordinate. The starting pixel and ending pixel of a line segment can both be referred to as end pixels, since they define either end of the line segment. In some examples, a Hough transformation can be applied to an image mask or edge image to identify the set of coordinates defining each line segment, where the line segments collectively form a data line depicted in the image mask or edge image, even though the Hough transformation may be a lane detection algorithm conventionally used in autonomous driving technology. One type of Hough transform can be the probabilistic Hough transform, which can involve collecting random samples of edge points and using them to generate the line segments. By applying the Hough transformation, the computing system can identify end pixels defining the line segments.

Figure 23:
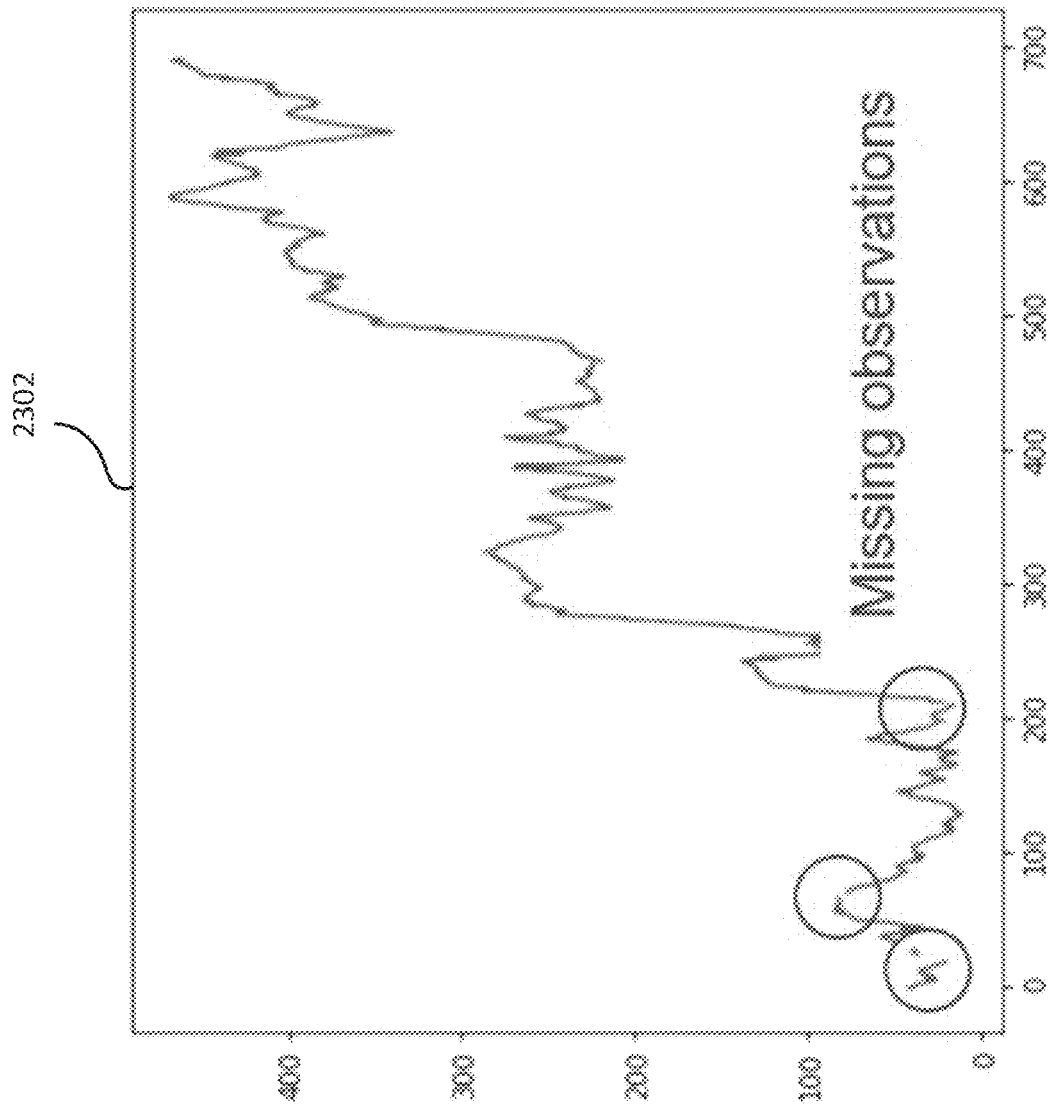
FIG. 23 shows an example of an initial pixel set with missing observations according to some aspects.

Since some line segments may overlap partially with other line segments along with X and Y coordinates, in some examples the coordinate data may be aggregated by mean values. For example, line segments may involve three pixels: (10, 25), (10, 75), and (10,110). These pixels can be can be combined into a single pixel with coordinates (10, 70). They coordinate value 70 is the average value of 25, 75, and 110. Using this process, overlapping pixel coordinates can be replaced so that all of the pixels have distinct X- and Y-coordinate values. FIG. 23 shows an example of a graph 2302 generated with all of the distinct X- and Y-coordinate pixel values. The graph 2302 has some disconnected parts where there are gaps. These gaps introduce missing pixels into the pseudo time-series dataset.

At block 1316, the computing system interpolates between adjacent line segments that are disconnected from one another to estimate the missing pixels that would connect the adjacent line segments together. For example, the computing system can use the end pixels (e.g., the starting pixel and the ending pixel) of the line segments to generate a plot that may be conceptualized as a recreation of the image mask or edge image. To do so, the computing system can rearrange the end pixels defining the line segments, remove duplicated pixels, and generate the plot using the rearranged pixels. The plot may be distinct from the image mask or edge imaged used to generate the line segments. In some cases, there may be gaps between adjacent line segments in the plot where the line segments are disconnected. So, the computing system can interpolate any missing pixels between adjacent line segments that are disconnected from one another. In some examples, this interpolation process may occur iteratively until all the missing pixels that would connect together the adjacent line segments have been estimated. Linear interpolation techniques can be used to implement this operation in some examples, though other interpolation techniques may alternatively be used.

Figure 24:
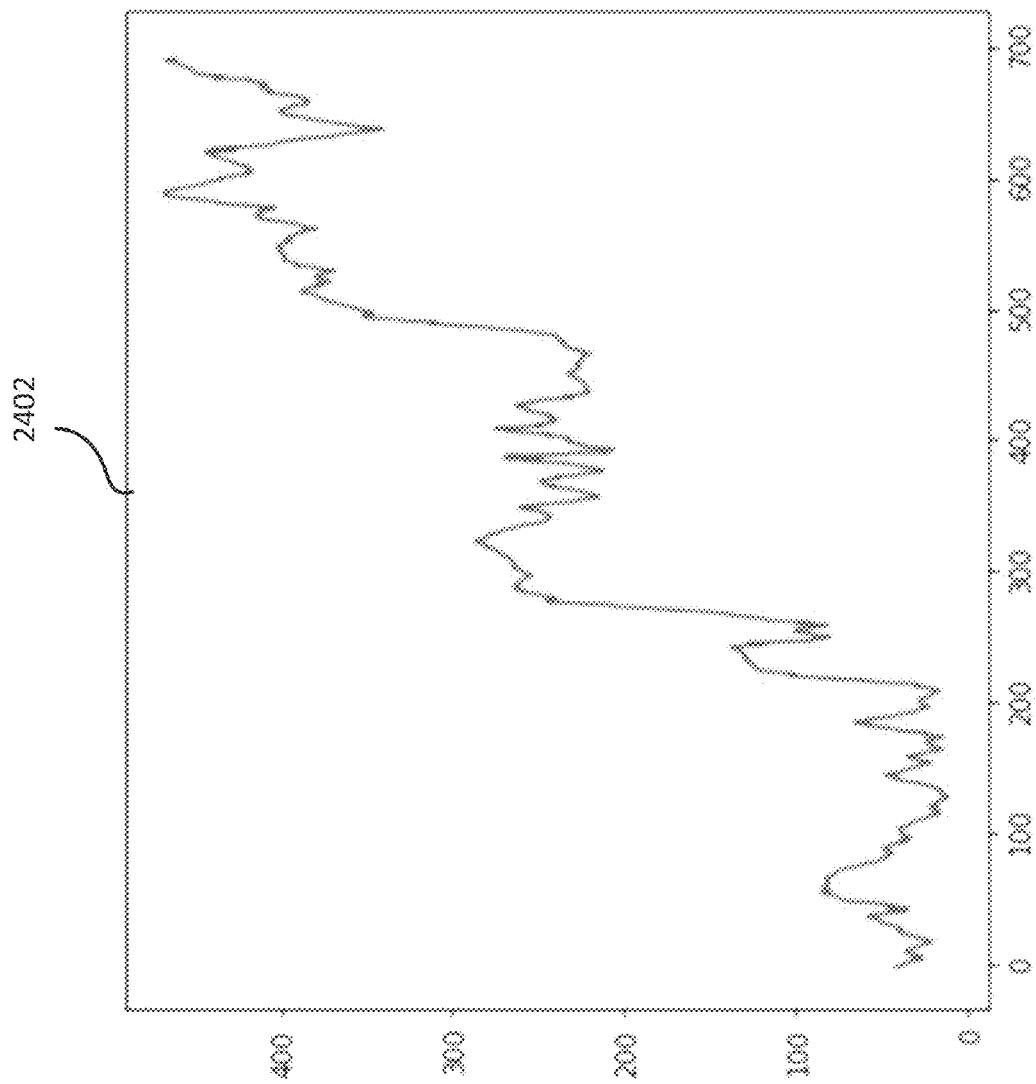
FIG. 24 shows an example of a final pixel set with interpolated observations according to some aspects.

The collection of end pixels defining the line segments and the interpolated pixels can produce a pixel set that collectively represents the data line depicted in the image mask or the edge image. The pixel set may be conceptualized as a "pseudo time-series dataset" defining the data line. One example of such a pixel set is shown in graph 2402 of FIG. 24, whereby this pixel set defines data line 1402 of FIG. 14. Operations 1314-1316 can be repeated for multiple image masks or edge images to determine a pixel set for each data line depicted therein.

At block 1318, the computing system provides at least one pixel set as input for a computing operation. One example of the computing operation can be a forecast operation in which a forecasting model is applied to the pixel set. Examples of the forecasting model can include a neural network (e.g., a recurrent neural network such as a long-short term memory model) or another type of machine-learning model, an Auto Regressive Integrated Moving Average (ARIMA) model, an Exponential Smoothing Macro (ESM) model, or a combination thereof. Another example of the computing operation can involve a time-series analysis operation. One example of a time-series analysis operation can include a search operation for searching the at least one pixel set based on a search criterion. Another example of a time-series analysis operation can include a decomposition operation for decomposing the at least one pixel set into one or more subcomponents, such as level, trend, seasonality, and noise components.

The computing operation may be executed by the computing system or by a remote computing system. For example, the computing system may provide the at least one pixel set as input to a forecasting operation by transmitting the at least one dataset over one or more networks (e.g., a local area network or the Internet) to a remote cloud-computing system, which can execute the forecasting operation and return a result thereof back to the computing system. Alternatively, the computing system may provide the at least one pixel set as input to a local forecasting application that is configured to execute the forecasting operation.

In some examples, each pixel set may be converted into a corresponding time series dataset for use as input in the computing operation. For example, the computing system can use the axis values in the original image and the coordinates of the pixels in a pixel set to convert the pixels in the pixel set into data points collectively forming a time series dataset. Each data point may have a time value and a magnitude value. This may enable a wider variety of computing operations to be applied and improved integration with systems that rely on time series datasets.

At block 1320, the computing system outputs a processing result from the computing operation. For example, the computing operation may be a forecasting operation can be applied to a pixel set to produce a predicted time series that spans a future time period. The computing system can receive the predicted time series as a processing result and output the predicted time series on a display device, such as a liquid crystal display (LCD) device or a light-emitting diode (LED) display device.

Figure 19:
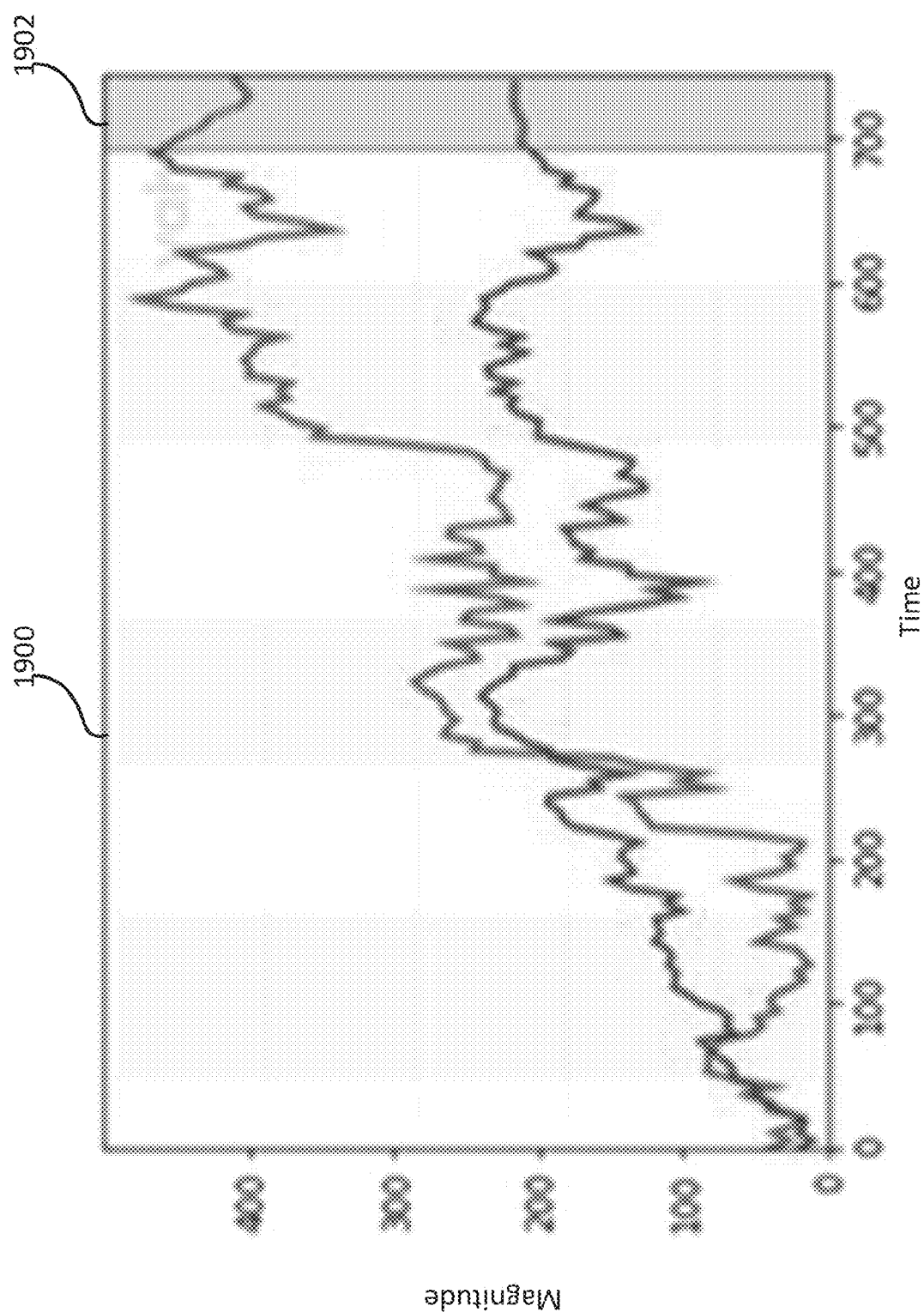
FIG. 19 shows an example of an aggregate image in which a predicted time series is appended to an original image according to some aspects.

In some examples, the computing system can generate an aggregate image based on the processing result. If the computing operation is a forecasting operation and the processing result is a predicted time series, the aggregate image may be a forecasting image that is generated from both the pixel set and the predicted time series, where the predicted time series is depicted in as being concatenated to the end of the pixel set to produce one continuous data line extending through the future time period. The forecasting image may use the same axis variables as the original image. One example of such a forecasting image 1900 is shown in FIG. 19, where the highlighted region 1902 depicts the forecasted part of the image.

Figure 26:
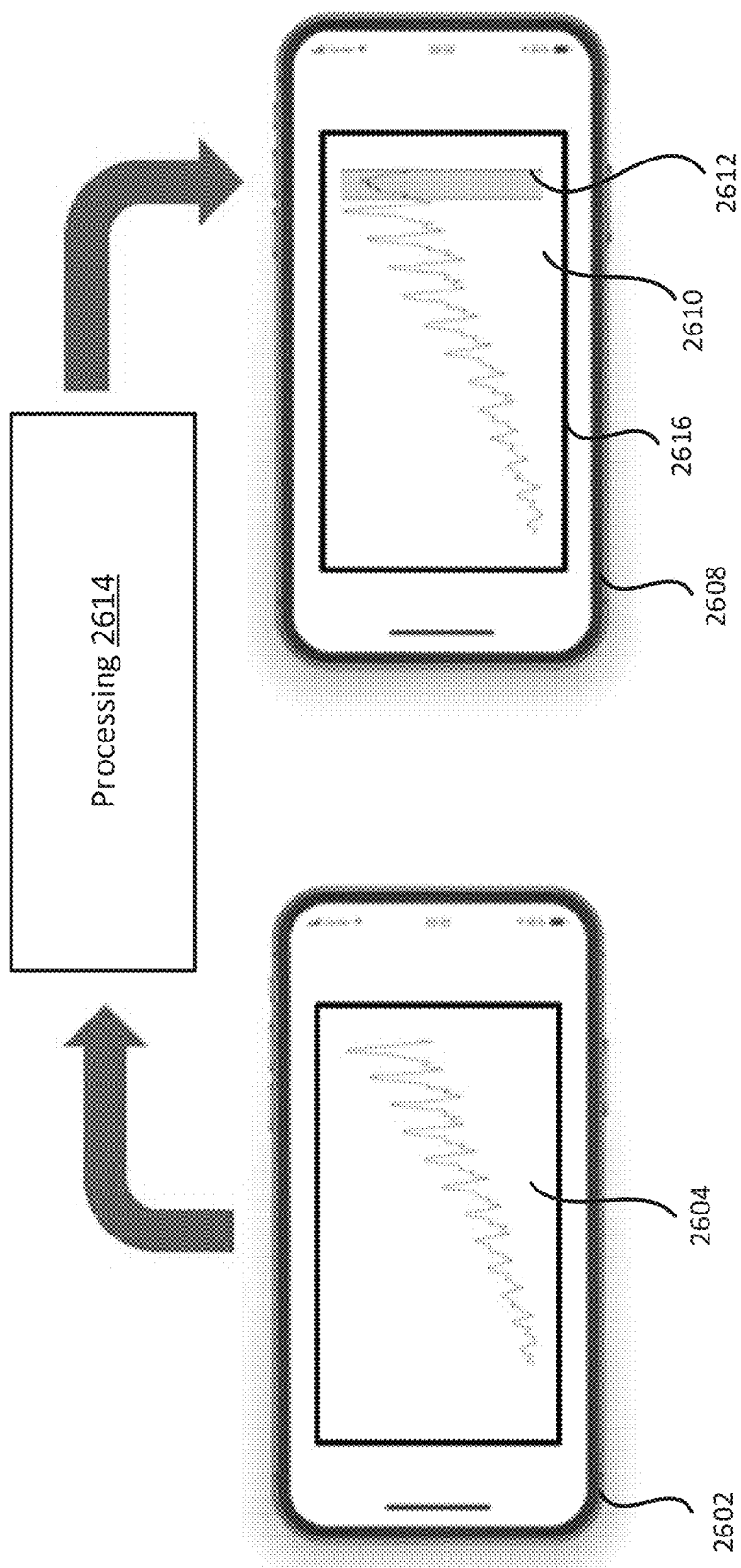
FIG. 26 shows an example of a process for generating a forecasting image from an original image according to some aspects.
Figure 27:
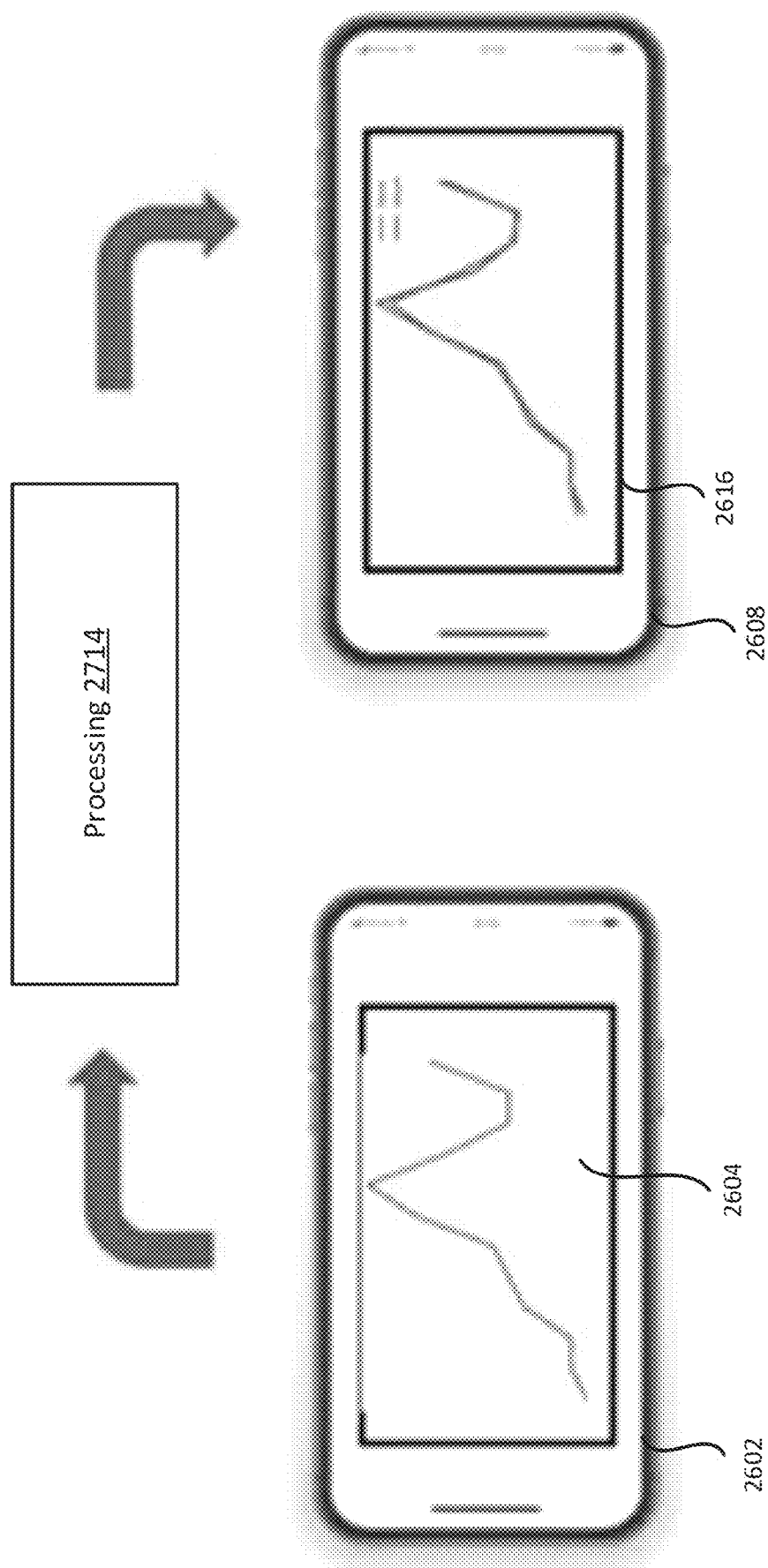
FIG. 27 shows an example of performing a search process on a pixel set according to some aspects.

One example of the overall process for generating a forecasting image is shown in FIG. 26. As shown, the process begins with a computing system 2602 (e.g., a mobile phone, tablet, laptop computer, a server, or a desktop computer) obtaining an image 2604. The computing system 2602 can obtain the image 2604, for example, from an image repository or by capturing the image using a camera coupled to the computing system 2602. In box 2614, the image 2604 is processed by executing at least some of the operations 1302-1316 described above to generate a pixel set. A forecast image 2610 can then be generated based on the pixel set. In the forecast image 2610, the original image 2604 is supplemented with forecast data 2612. The forecast image 2610 is then output on the display device 2616 of a computing system 2608, which may be the same as or different from the computing system 2602 that obtained the original image 2604.

In another example, the computing operation can include a search operation for searching a library (e.g., a repository) of stored time-series to find one or more stored time series that are similar to the pixel set. The search operation may be implemented by searching the library to identify one or more stored time-series with shapes that "match" (e.g., that are sufficiently similar according to one or more predefined criteria) the shape of the pixel set. The computing system can perform such a search and output the one or more identified time-series on the display device, for example in a plot that also includes the pixel set, so that a viewer can easily compare the two. One example of this process is shown in FIG. 26. As shown, the process begins with a computing system 2602 obtaining an image 2604. In box 2714, the image 2604 is processed by executing at least some of the operations 1302-1316 described above to generate a pixel set, which can then be provided as input for the search operation. The processing 2714 can also involve executing the search operation to identify one or more time series stored in a repository that match the pixel set. The one or more identified time-series may then be output on a display device 2616 of a computing system 2608, which may be the same as or different from the computing system 2602 that obtained the original image 2604. For example, the identified time-series can be output on the display device 2616 in a plot that also includes the pixel set, so that a viewer can easily compare the two.

The computing system can perform one or more tasks based on the processing result. Examples of such tasks may include generating images (e.g., a forecasting image) and/or outputting the processing result on a display device, as described above. Other examples of tasks may include operating an actuator, a drive unit, a steering unit, a gear shifter, and/or a motor to control operation of a robotic component or a vehicle, such as a drone or autonomous car. Still other examples of tasks may include operating a valve, latch, or hatch, or operating any other suitable mechanical or electrical component. Further examples of tasks may include computing operations such generating images, storing information in databases, communicating with remote computing devices, or performing analytical operations. Any number and combination of tasks may be performed based on the processing results.

FIG. 20 depicts an example of program code 2000 (e.g., Python code) that is executable to carry out some or all of the process described above. For example, the program code 2000 includes a function to detect the number of data lines in an input image by color and return corresponding RBG statistics such as the maximum and minimum values of the RGB color values across all pixels assigned to the pixel cluster. The program code 2000 also includes a function to extract pseudo time-series data based on the RGB statistics. The program code 2000 then includes functions to execute a forecasting algorithm and return a resulting aggregate image. Of course, this example of program code is intended to be illustrative and non-limiting. In other examples the program code may include more, less, or different functionality than described above.

Figure 25A:
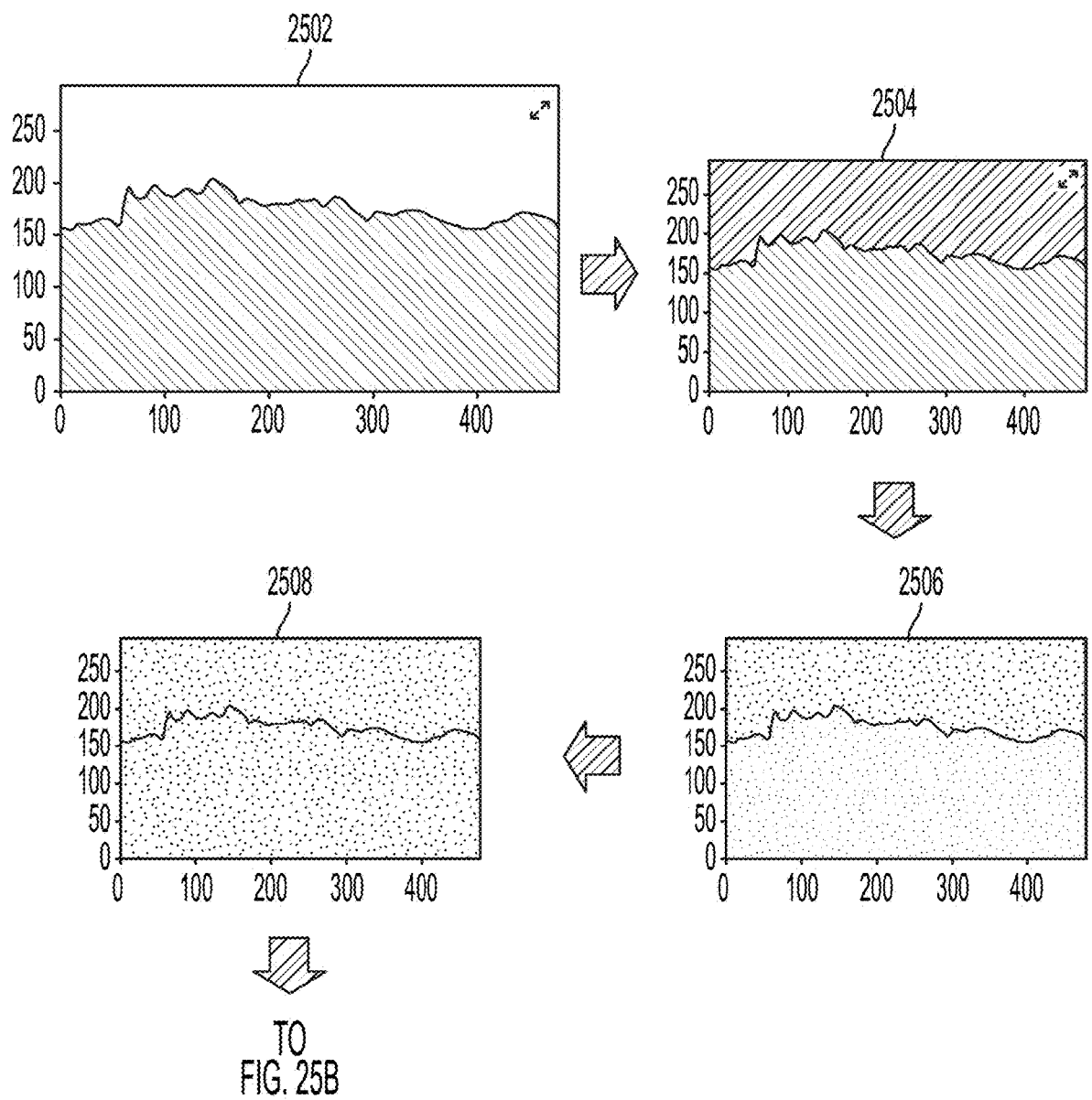
FIGS. 25A-B show an example of a process for generating a pixel set associated with time series information based an area plot according to some aspects.
Figure 25B:
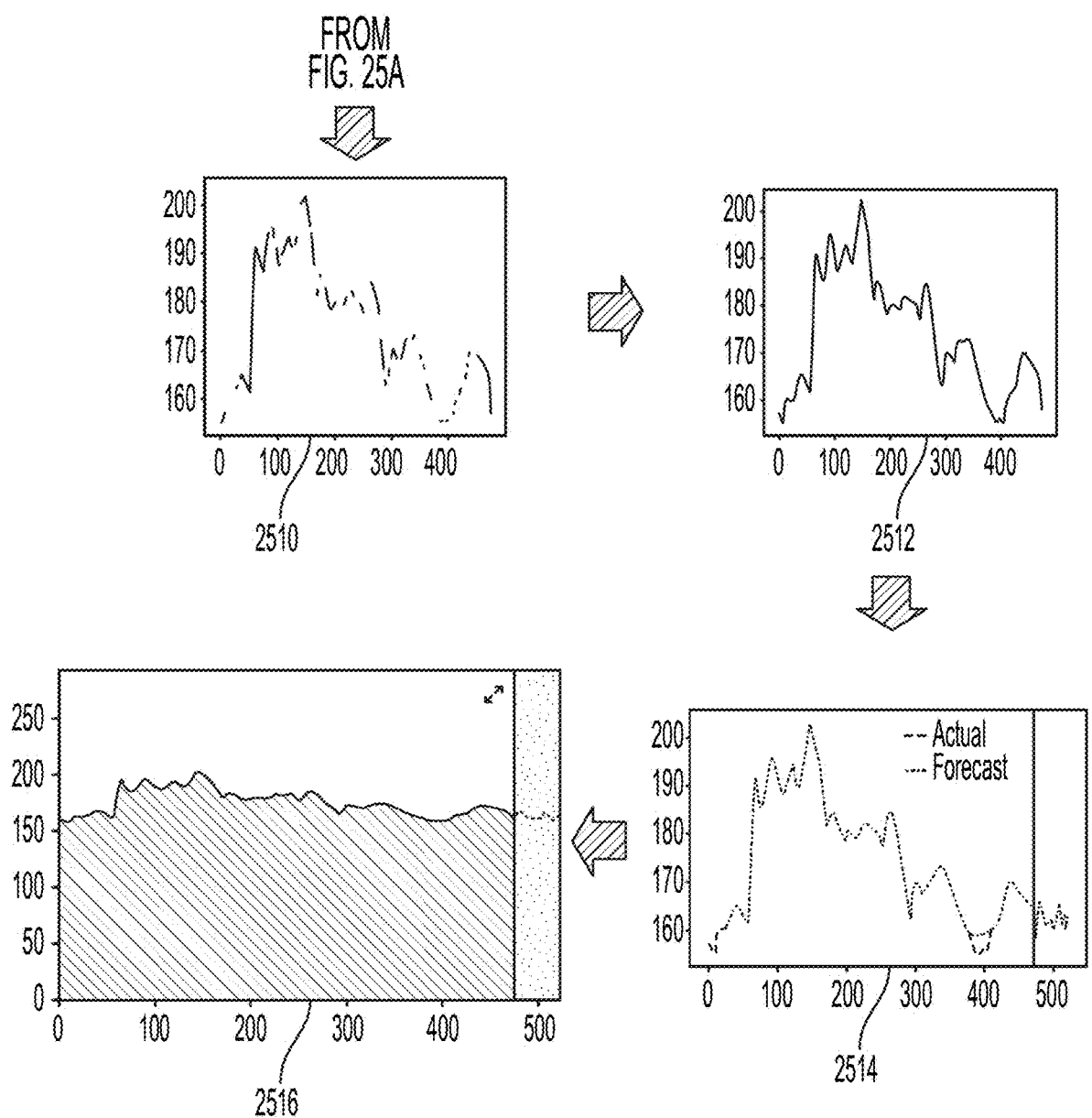

While the examples herein are described in relation to line graphs, the same process can be applied to area plots or other types of time series plots. An example of this process as applied to an area plot 2502 is shown in FIGS. 25A-B. As shown, the area plot 2502 is an RGB image. The system can convert the RGB image into an HSV format 2504. From the HSV image, the system can generate the image masks 2506 corresponding to the colors that are detected using a color clustering process. Edge detection can then be applied to the mask images to generate edge images 2508, to which object detection techniques can be applied to generate an initial pixel set 2510. Interpolation can then be performed to generate a final pixel set 2412. The final pixel set can serve as a pseudo time-series dataset that describes the time series line on the area plot 2502. The pixel set can then be supplied as inputs to further computing operations, such as a forecasting operation to generate forecast values shown in graph 2514. In one such example, the forecast values can be added to the original image to generate a forecast image 2516.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors for causing the one or more processors to:
access an image depicting a time series graph having a plurality of data lines representing a plurality of time series datasets;
execute a clustering process to assign each pixel in the image to one of a plurality of pixel clusters based on one or more color values of the pixel, each pixel cluster of the plurality of pixel clusters corresponding to a respective data line of the plurality of data lines;
generate a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters;
identify a respective set of line segments defining the respective data line associated with each image mask of the plurality of image masks by performing object detection on the image mask or an edge image derived from the image mask;
determine a plurality of pixel sets associated with the plurality of time series datasets based on the respective set of line segments associated with each image mask;
provide at least one pixel set of the plurality of pixel sets as input for a computing operation that is configured to process the at least one pixel set and return a processing result; and
output the processing result for display on a display device.

2. The system of claim 1, wherein the image is a preprocessed image, and wherein the one or more memories further include program code that is executable by the one or more processors for causing the one or more processors to, prior to accessing the image:
generate the preprocessed image from an original image by executing one or more image-processing techniques on the original image.

3. The system of claim 2, wherein the one or more image-processing techniques include an image-dilation technique configured to increase a line thickness of plurality of data lines such that the preprocessed image has thicker data lines than the original image.

4. The system of claim 3, wherein the one or more image-processing techniques include an image-resizing technique configured to downsize the original image into a smaller image such that the preprocessed image has fewer total pixels than the original image.

5. The system of claim 1, wherein the clustering process involves executing a color-based clustering algorithm to assign image pixels to the plurality of pixel clusters based on red, green, and blue (RGB) values of each image pixel.

6. The system of claim 1, wherein the respective set of attributes includes a respective set of statistical values associated with the respective pixel cluster, and wherein the one or more memories further include program code that is executable by the one or more processors for causing the one or more processors to determine the respective set of statistical values based on one or more color values of each pixel in the respective pixel cluster.

7. The system of claim 6, wherein the respective set of statistic values includes (i) a set of minimum RGB values assigned to the respective pixel cluster and (ii) a set of maximum RGB values assigned to the respective pixel cluster.

8. The system of claim 1, wherein the one or more memories further include program code that is executable by the one or more processors for causing the one or more processors to generate the plurality of image masks by:
converting the image from an RGB format to a hue, saturation, value (HSV) format to produce a reformatted image;
determining a plurality of HSV ranges defining the plurality of data lines depicted in the reformatted image based on the attributes of the plurality of pixel clusters, each HSV range of the plurality of HSV ranges spanning a respective set of HSV values that define a respective data line of the plurality of data lines depicted in the reformatted image; and
generating the plurality of image masks based on the plurality of HSV ranges, each image mask of the plurality of image masks corresponding to a respective HSV range of the plurality of HSV ranges and depicting a single data line of the plurality of data lines.

9. The system of claim 1, wherein the one or more memories further include program code that is executable by the one or more processors for causing the one or more processors to identify the respective set of line segments by:
executing an edge-detection algorithm on the plurality of image masks to generate edge images with sharpened line edges; and
executing an object-detection algorithm on the edge images to identify the respective set of line segments.

10. The system of claim 9, wherein the object-detection algorithm includes a Hough transform.

11. The system of claim 1, wherein the one or more memories further include program code that is executable by the one or more processors for causing the one or more processors to determine missing pixels between adjacent pairs of line segments that define a data line of the plurality of data lines by performing interpolation between the adjacent pairs of line segments, wherein the adjacent pairs of line segments are included in the respective set of line segments associated with the data line.

12. The system of claim 1, further comprising the display device and a camera usable to capture the image.

13. The system of claim 1, wherein the at least one pixel set is associated with data points spanning a first timeframe, wherein the computing operation includes a forecasting operation configured to generate a predicted time series based on the at least one pixel set, wherein the predicted time series spans a second timeframe that is subsequent to the first timeframe, and wherein the processing result includes the predicted time series.

14. The system of claim 13, wherein the one or more memories further include program code that is executable by the one or more processors for causing the one or more processors to output the processing result by:
 generating an aggregate image that depicts at least one data line of the plurality of data lines along with the predicted time series; and
 outputting the aggregate image.

15. The system of claim 1, wherein the computing operation includes a time-series analysis operation, the time-series analysis operation including (i) a search operation for searching the at least one pixel set based on a search criterion or (ii) a decomposition operation for decomposing the at least one pixel into one or more subcomponents.

16. A method comprising:
 accessing, by one or more processors, an image depicting a time series graph having a plurality of data lines representing a plurality of time series datasets;
 executing, by the one or more processors, a clustering process to assign each pixel in the image to one of a plurality of pixel clusters based on one or more color values of the pixel, each pixel cluster of the plurality of pixel clusters corresponding to a respective data line of the plurality of data lines;
 generating, by the one or more processors, a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters;
 identifying, by the one or more processors, a respective set of line segments defining the respective data line associated with each image mask of the plurality of image masks by performing object detection on the image mask or an edge image derived from the image mask;
 determining, by the one or more processors, a plurality of pixel sets associated with the plurality of time series datasets based on the respective set of line segments associated with each image mask;
 providing, by the one or more processors, at least one pixel set of the plurality of pixel sets as input for a computing operation that is configured to process the at least one pixel set and return a processing result; and
 outputting, by the one or more processors, the processing result for display on a display device.

17. The method of claim 16, wherein the image is a preprocessed image, and further comprising, prior to accessing the image:
 generating the preprocessed image from an original image by executing one or more image-processing techniques on the original image.

18. The method of claim 17, wherein the one or more image-processing techniques include an image-dilation technique configured to increase a line thickness of plurality of data lines such that the preprocessed image has thicker data lines than the original image.

19. The method of claim 17, wherein the one or more image-processing techniques include an image-resizing technique configured to downsize the original image into a smaller image such that the preprocessed image has fewer total pixels than the original image.

20. The method of claim 16, wherein the clustering process involves executing a color-based clustering algorithm to assign image pixels to the plurality of pixel clusters based on red, green, and blue (RGB) values of each image pixel.

21. The method of claim 16, wherein the respective set of attributes includes a respective set of statistical values associated with the respective pixel cluster, and further comprising determining the respective set of statistical values based on one or more color values of each pixel in the respective pixel cluster.

22. The method of claim 21, wherein the respective set of statistic values includes (i) a set of minimum RGB values assigned to the respective pixel cluster and (ii) a set of maximum RGB values assigned to the respective pixel cluster.

23. The method of claim 16, further comprising generating the plurality of image masks by:
 converting the image from an RGB format to a hue, saturation, value (HSV) format to produce a reformatted image;
 determining a plurality of HSV ranges defining the plurality of data lines depicted in the reformatted image based on the attributes of the plurality of pixel clusters, each HSV range of the plurality of HSV ranges spanning a respective set of HSV values that define a respective data line of the plurality of data lines depicted in the reformatted image; and
 generating the plurality of image masks based on the plurality of HSV ranges, each image mask of the plurality of image masks corresponding to a respective HSV range of the plurality of HSV ranges and depicting a single data line of the plurality of data lines.

24. The method of claim 16, further comprising identifying the respective set of line segments by:
 executing an edge-detection algorithm on the plurality of image masks to generate edge images with sharpened line edges; and
 executing an object-detection algorithm on the edge images to identify the respective set of line segments.

25. The method of claim 24, wherein the object-detection algorithm includes a Hough transform.

26. The method of claim 16, further comprising determining missing pixels between adjacent pairs of line segments that define a data line of the plurality of data lines by performing interpolation between the adjacent pairs of line segments, wherein the adjacent pairs of line segments are included in the respective set of line segments associated with the data line.

27. The method of claim 16, wherein the at least one pixel set is associated with data points spanning a first timeframe, wherein the computing operation includes a forecasting operation configured to generate a predicted time series based on the at least one pixel set, wherein the predicted time series spans a second timeframe that is subsequent to the first timeframe, and wherein the processing result includes the predicted time series.

28. The method of claim 27, further comprising outputting the processing result by:
   generating an aggregate image that depicts at least one data line of the plurality of data lines and the predicted time series; and
   outputting the aggregate image.

29. The method of claim 16, wherein the computing operation includes a time-series analysis operation, the time-series analysis operation including (i) a search operation for searching the at least one pixel set based on a search criterion or (ii) a decomposition operation for decomposing the at least one pixel into one or more subcomponents.

30. A non-transitory computer-readable medium comprising program code that is executable by one or more processors for causing the one or more processors to:
   access an image depicting a time series graph having a plurality of data lines representing a plurality of time series datasets;
   execute a clustering process to assign each pixel in the image to one of a plurality of pixel clusters based on one or more color values of the pixel, each pixel cluster of the plurality of pixel clusters corresponding to a respective data line of the plurality of data lines;
   generate a plurality of image masks based on attributes of the plurality of pixel clusters, each image mask of the plurality of image masks depicting a respective data line of the plurality of data lines and being generated based on a respective set of attributes associated with a respective pixel cluster of the plurality of pixel clusters;
   identify a respective set of line segments defining the respective data line associated with each image mask of the plurality of image masks by performing object detection on the image mask or an edge image derived from the image mask;
   determine a plurality of pixel sets associated with the plurality of time series datasets based on the respective set of line segments associated with each image mask;
   provide at least one pixel set of the plurality of pixel sets as input for a computing operation that is configured to process the at least one pixel set and return a processing result; and
   perform at least one task based on the processing result.

* * * * *